(12) United States Patent
Nag et al.

(10) Patent No.: US 7,013,338 B1
(45) Date of Patent: Mar. 14, 2006

(54) MULTIPLEXING SEVERAL INDIVIDUAL APPLICATION SESSIONS OVER A PRE-ALLOCATED RESERVATION PROTOCOL SESSION

(75) Inventors: Siddhartha Nag, Holmdel, NJ (US); Alfred D'Souza, Lincroft, NJ (US); Naveed Alam, Freehold, NJ (US)

(73) Assignee: Prominence Networks, Inc., Holmdel, NJ (US)

( * ) Notice: Subject to any disclaimer, the term of this patent is extended or adjusted under 35 U.S.C. 154(b) by 804 days.

(21) Appl. No.: 09/634,035

(22) Filed: Aug. 8, 2000

Related U.S. Application Data

(60) Provisional application No. 60/221,571, filed on Jul. 28, 2000.

(51) Int. Cl.
*G06F 15/16* (2006.01)

(52) U.S. Cl. .................. 709/226; 709/227; 709/228; 709/249

(58) Field of Classification Search .............. 709/223, 709/241, 230, 226, 227, 228, 249; 370/236, 370/431, 356, 401, 256, 230, 235
See application file for complete search history.

(56) References Cited

U.S. PATENT DOCUMENTS

| | | | |
|---|---|---|---|
| 5,831,975 A | * | 11/1998 | Chen et al. ................. 370/256 |
| 5,958,009 A | | 9/1999 | Friedrich et al. |
| 6,009,469 A | | 12/1999 | Mattaway et al. |

(Continued)

FOREIGN PATENT DOCUMENTS

| | | |
|---|---|---|
| EP | 1017200 | 7/2000 |

(Continued)

OTHER PUBLICATIONS

Lee, K.; "Adaptive network support for mobile multimedia", 1st Annual International Conference on Mobile Computing and Networking, ISBN 0897918142, 1945.*

(Continued)

*Primary Examiner*—Marc D. Thompson
(74) *Attorney, Agent, or Firm*—Faegre & Benson, LLP

(57) ABSTRACT

Apparatus and methods are provided for multiplexing application flows over a pre-allocated bandwidth reservation protocol session. According to one embodiment, a pre-allocated reservation protocol session, such as an RSVP session, is shared by one or more application sessions. The reservation protocol session is pre-allocated over a path between a first network device associated with a first user community and a second network device associated with a second user community based upon an estimated usage of the path for application sessions between users of the first and second user communities. Subsequently, the one or more application sessions are dynamically aggregated by multiplexing application flows associated with the one or more individual application sessions onto the pre-allocated reservation protocol session at the first network device and demultiplexing at the second network device. According to another embodiment, a network device enables multiple applications, such as VoIP applications, that require real-time performance to share an aggregated reservation protocol session, such as an RSVP session. The network device includes a storage device having stored therein one or more routines for establishing and managing the aggregated reservation protocol session. A processor coupled to the storage device executes the one or more routines to pre-allocate the aggregated reservation protocol session and thereafter share the aggregated reservation protocol session among multiple application sessions of individual application sessions. The aggregated reservation protocol session is pre-allocated based upon an estimate of the bandwidth requirements to accommodate the multiple application sessions. The aggregated reservation protocol session is shared by multiplexing, onto the aggregated reservation protocol session, outbound media packets (e.g., packetized voice data) originated by local application/endpoints associated with the application sessions, and demultiplexing, from the aggregated reservation protocol session, inbound media packets (e.g., packetized voice data) originated by remote application/endpoints.

85 Claims, 14 Drawing Sheets

U.S. PATENT DOCUMENTS

| | | | |
|---|---|---|---|
| 6,026,443 A * | 2/2000 | Oskouy et al. | 709/230 |
| 6,054,987 A | 4/2000 | Richardson et al. | |
| 6,061,723 A | 5/2000 | Walker et al. | |
| 6,104,721 A * | 8/2000 | Hsu | 370/431 |
| 6,108,310 A | 8/2000 | Wilkinson et al. | |
| 6,208,638 B1 | 3/2001 | Rieley et al. | |
| 6,212,562 B1 | 4/2001 | Huang et al. | |
| 6,226,678 B1 | 5/2001 | Mattaway et al. | |
| 6,243,376 B1 | 6/2001 | Ng et al. | |
| 6,243,759 B1 | 6/2001 | Boden et al. | |
| 6,259,771 B1 | 7/2001 | Kredo et al. | |
| 6,298,120 B1 | 10/2001 | Civanlar et al. | |
| 6,366,577 B1 | 4/2002 | Donovan et al. | |
| 6,418,139 B1 * | 7/2002 | Akhtar | 370/356 |
| 6,463,089 B1 * | 10/2002 | Chauncey et al. | 375/131 |
| 6,493,348 B1 * | 12/2002 | Gelman et al. | 370/401 |
| 6,515,966 B1 * | 2/2003 | Bardalai et al. | 370/236 |
| 6,606,668 B1 * | 8/2003 | MeLampy et al. | 709/241 |
| 6,639,981 B1 | 10/2003 | Dunn, Jr. et al. | |
| 6,640,248 B1 | 10/2003 | Jorgensen et al. | |
| 6,647,208 B1 * | 11/2003 | Kirby | 398/45 |
| 6,678,729 B1 | 1/2004 | Ahoor et al. | |
| 6,714,987 B1 | 3/2004 | Amin et al. | |
| 2002/0015387 A1 | 2/2002 | Houh et al. | |
| 2002/0049860 A1 | 4/2002 | Kolstinen et al. | |
| 2004/0073641 A1 | 4/2004 | Minhazuddin et al. | |

FOREIGN PATENT DOCUMENTS

| | | |
|---|---|---|
| WO | WO 00/77988 | 12/2000 |
| WO | WO 01/31939 | 5/2001 |
| WO | WO 02/13023 | 2/2002 |

OTHER PUBLICATIONS

Terzis, A. et al.; "Reservations for aggregate traffic: experiences from an RSVPtunnels implementation", 1998 Sixth 6th International Workshop on Quality of Service (IWQoS), ISBN 0780344820, 1998.*

Terzis, A. et al.; Request for Comments (RFC) 2746, "RSVP Operation Over IP Tunnels", Jan. 2000.*

Eder, M., et al., "Service Management Architectures Issues and Review," Jan. 2001, printed from Internet at: ftp://ftp.isi.edu/in-notes/rfc3052.txt (12 pages).

Eder, M., et al., "IP Service Management in the QoS Network," Nov. 2001, printed from Internet at: http://search.ietf.org/internet-drafts/draft-irft-smrg-ipsmf-01.txt (15 pages)

Beker, L., et al., Aggregation of RSVP for IPv4 and IPv6 Reservations, Sep. 2001, printed from Internet at: http://www.letf.org/rfc/rfc3175.txt?number=3175 (34 pages).

Braden, R., et al., RFC2205—Resource ReSerVation Protocol (RSVP)—Version 1 Functional Specification, Sep. 1997, printed from Internet at: http://www.faqs.org/rfcs/rfc2205.html (79 pages).

Zhu, C., et al., RFC 2190—RTP Payload Format for H.263 Video Streams, Sep. 1997, printed from Internet at: http://www.faqs.org/rfcs/rfc2190.html (10 pages).

Handley, M., et al., SIP: Session Initiation Protocol, Mar. 1999, printed from Internet at: ftp://ftp.isl.edu/in-notes/rfc2543.txt (143 pages).

SIP: Session Initiation Protocol, updated Aug. 2004, printed from Internet at: http://www.cs.columbia.edu/sip (1 page).

SIP: Session Initiation Protocol—Implementations, News, updated Aug. 2004, printed from Internet at: http://www.cs.columbia.edu/sip/news.html (4 pages).

Measures network performance and predicts the impact of changes, Chariot, 2004, NetIQ Corporation (2 pages).

NetIQ: Chariot, 1993-2004, NetIQ Corporation, printed from Internet at: http://www.netiq.com/products/chr/default.asp?print=true (1 page).

Delivers comprehensive service management for windows, UNIX and Linux systems and applications, NetIQ AppManager Suite, 2004, NetIQ Corporation (4 pages).

Delivers Enterprise VoIP QoS and Management, AppManager for VoIP, 2004, NetIQ Corporation (4 pages).

NetIQ's VoIP Management Solution, 2004, NetIQ Corporation (2 pages).

NetIQ: Appmanager for VoIP, 1993-2004, NetIQ Corporation, printed from the Internet at: http://www.netIq.com/products/am/modules/voip.asp?print=true (1 page).

Pearsall, S., et al., DoIng a VoIP Assessment with Vivinet Assessor, netiQ Work Smarter, 2001-2002, NetIQ Corporation (19 pages).

Delivers the leading software solution for assessing a data network's readiness for VoIP, Vivinet Assessor, 2004, NetIQ Corporation (2 pages).

NetIQ: Vivinet Assessor, 1993-2004, NetIQ Corporation, printed from the Internet at: http://www.netIq.com/products/va/default.asp?print=true (1 pages).

Pinpoints VoIP quality problems in minutes, Vivinet Diagnostics, 2004, NetIQ Corporation (2 pages).

NetIQ: Vivinet Diagnostics, 1993-2004, NetIQ Corporation, printed from the Internet at: http://www.netIq.com/products/vd/default.asp?print=true (1 page).

NetIQ: VoIP Management Solution, 1993-2004, NetIQ Corporation, printed from the Internet at:: http://www.netiq.com/solutions/voip/default.asp?print=true (1 page).

Micromuse: Products & Solutions—Netcool Suite Overview, 2004, Micromuse, Inc., printed from the Internet at: http://www.micromuse.com/products_sols/index.html (9 pages).

Netcool Solutions for Voice Over IP, Realtime Service Quality Management for IP Telephony Services, Micromuse, Inc. (4 pages).

Netcool Solutions for Enterprise, End-To-End Business and Service Assurance, Micromuse, Inc. (6 pages).

Netcool/System Service Monitors White Paper, Including Netcool/Applications Service Monitors, 2003, Micromuse, Inc. (8 pages).

Netcool/Monitors Product Family—Realtime and Trended Performance, Status and Service Monitoring, 2004, Micromuse, Inc. (4 pages).

Netcool/Usage Service Monitors White Paper (Netcool/USMs), 2003, Micromuse, Inc. (11 pages).

Netcool/Precision for IP Networks: Discovery & Topology-/Based /RCA, Micromuse, Inc., (12 pages).

Realtime Event Management for Business and Service Assurance, Micromuse, Inc. (4 pages).

Farrell, C., Grappling With Management Of IP Telephony, Internet Telephony, May 2004, Technology Marketing Corporation (2 pages).

NetIQ VoIP Manager Connector For Netcool/OMNIbus, Micromuse, Inc. (1 page).

Allen, P., Putting new service management tactics to work, Service providers can make smarter use of service management technology, ServerWorld, vol. 16, No. 4, Apr. 2002 (3 pages).

HP OpenView Network Services—Management—Business blueprint, 2004, Hewlett-Packard Development Company, L.P. (6 pages).

Management Software—IP telephony management solutions overview & features, 2004, Hewlett-Packard Development Company, L.P., printed from the Internet at: http://www.openview.hp.com/cgi-bin/pf-new.cgi?IN=hp//products/nnm/prod_nnm_0002.h . . . (1 page).

Management Software—Alliance with Cisco Systems, Inc., 2004, Hewlett-Packard Development Company, L.P., printed from the Internet at: http://www.openview.hp.com/cgi-bin/pf-new.cgi?IN=hp//partners/alliances/pall_0001.html (2 pages).

Cisco HP Smart Way 2004 Solution Brief, 2003, Cisco Systems and Hewlett-Packard (4 pages).

HP Open View, Network Node Manager Smart Plug-in for Advanced routing 1.0 Data sheet, 2003-2004, Hewlett-Packard Development Company, L.P. (4 pages).

HP OpenView Performance Insight Report Pack for IP Telephony 1.2, 2004, Hewlett-Packard Development Company, L.P. (8 pages).

Hp OpenView, glanceplus and glanceplus pak product brief, 2003, Hewlett-Packard Company (6 pages).

HP OpenView, Performance Manager, Performance Monitor and Performance Agent data sheet, 2003, Hewlett-Packard Davelopment Company, L.P. (4 pages).

HP Open View, Service Quality Manager 1.1 data sheet, 2003, Hewlett-Packard Development Company, L.P. (4 pages).

Hp OpenView, service information portal 3.1 product brief, 2003, Hewlett-Packard Company (4 pages).

Hp OpenView, problem diagnosis 1.1 product brief, 2002, Hewlett-Packard Company (4 pages).

HP OpenView Performance Insight Pack for Infrastructure Usage, 2004, Hewlett-Packard Development Company, L.P. (6 pages).

HP OpenView, Network Node Manager Smart Plug-in for Advance Routing 1.0 Data sheet, 2003-2004, Hewlett-Packard Development Company, L.P. (4 pages).

HP OpenView, Customer Views 1.4 for Network Node Manager data sheet, 2003, Hewlett-Packard Development Company, L.P. (4 pages).

Hewlett-Packard OpenView—about Hewlett-Packard OpenView, 2004, Hewlett-Packard Development Company, L.P., printed from the Internet at: http://www/managementsoftware.hp.com/cgi-bin/pf-new.cgi?IN=hp//about/index.html (2 pages).

Hp OpenView, service quality manager product overview, 2003, Hewlett-Packard Company (16 pages).

Intelligent Diagnostics for Networks, Beyond root-cause analysIs, A white paper from HP—preliminary, 2003, Hewlett-Packard Development Company, L.P. (12 pages).

HP OpenView, Operations 7.x for Windows, Firewall Configuration white paper, 2002, Hewlett-Packard Company (60 pages).

Gain strategic advantage with HP IT Service Management, White paper, 2003, Hewlett-Packard Development Company, L.P. (8 pages).

Harbaum, T., et al., Layer 4+Switching with QOS Support for RTP and HTTP, 1999, Global Telecommunications Conference—GLOBECOM '99, pp. 1591-1596.

* cited by examiner

MULTIPLEXING SEVERAL INDIVIDUAL APPLICATION SESSIONS OVER A PRE-ALLOCATED RESERVATION PROTOCOL SESSION

This application claims the benefit of U.S. Provisional Application No. 60/221,571, filed Jul. 28, 2000, titled "Multiplexing Several Individual Application Sessions over a Pre-Allocated Reservation Protocol Session".

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

1. Field

Embodiments of the present invention relate generally to managing flows for a reservation protocol. More particularly, embodiments of the invention relate to a technique for pre-allocating an aggregated reservation protocol session and thereafter sharing the reservation protocol session among multiple individual application sessions by multiplexing the multiple individual application flows thereon.

2. Description of the Related Art

The transfer of voice traffic over packet networks, e.g., voice over Internet Protocol (VoIP), is rapidly gaining acceptance. However, significant work remains in the area of enhancing the quality of such services. One potential technique for improving the quality of voice calls involves the use of a bandwidth reservation protocol to communicate per-flow requirements by signaling the network. Typically, however, bandwidth reservation protocols require per-flow state information to be maintained at each intermediate node between the initiator and the prospective recipient. As a result, in a VoIP network relying on such bandwidth reservation protocols, scalability becomes an issue since each VoIP call reservation requires a non-trivial amount of ongoing message exchange, computation, and memory resources in each intervening node to establish and maintain the reservation.

An example of a particular bandwidth reservation protocol that illustrates this scalability problem is the Resource Reservation Protocol (RSVP). RSVP is an Internet Protocol—(IP) based protocol that allows applications running on end-stations, such as desktop computers, to communicate per-flow requirements by signaling the network. Using RSVP, the initiator of a VoIP call transmits a Path message downstream to the prospective recipient. The Path message causes state information, such as information regarding the reverse path to the initiator, to be stored in each node along the way. Subsequently, the prospective recipient of the VoIP call initiates resource reservation setup by communicating its requirements to an adjacent router via an upstream Resv message. For example, the prospective recipient may communicate a desired quality of service (QoS), e.g., peak/average bandwidth and delay bounds, and a description of the data flow to all intervening routers between the call participants. Additionally, after the reservation has been established, participating routers must continue to exchange periodic status and control messages to maintain the reservation. Consequently, processing and storage overhead associated with reservation establishment and maintenance increases linearly as a function of the number of calls. For further background and information regarding RSVP see Braden, R., Zhang, L., Berson, S., Herzog, S. and Jamin, S., "Resource Reservation Protocol (RSVP) Version 1 Functional Specification," RFC 2205, Proposed Standard, September 1997.

A proposed solution to RSVP's scalability problems can be found in F. Baker et al., "Aggregation of RSVP for IPv4 and IPv6 Reservations," Internet Draft, March 2000. However, the proposed solution requires a modification to RSVP, which would result in changes to router software. Additionally, the proposal does not use RSVP end-to-end, but rather uses Diff-Serv in the core. It may also require changes to other routing protocols like OSPF and IS—IS. Finally, it appears that there may also be additional burdens on network administrators to make the aggregation scheme work.

In light of the foregoing, what is needed is a less invasive technique for managing application flows that require real-time response, such as flows associated with VoIP services, and addressing scalability issues associated with bandwidth reservation protocols. It would also be desirable to minimize changes to the particular bandwidth reservation protocol employed and existing router software.

SUMMARY

Apparatus and methods are described for multiplexing application flows over a pre-allocated bandwidth reservation protocol session. According to one embodiment, a pre-allocated reservation protocol session is shared by one or more individual application sessions. The reservation protocol session is pre-allocated over a path between a first network device associated with a first user community and a second network device associated with a second user community based upon an estimated usage of the path for individual application sessions between users of the first and second user communities. Subsequently, the one or more individual application sessions are dynamically aggregated by multiplexing application flows associated with the one or more individual application sessions onto the pre-allocated reservation protocol session at the first network device and demultiplexing at the second network device.

According to another embodiment, a network device enables multiple applications to share an aggregated reservation protocol session. The network device includes a storage device having stored therein one or more routines for establishing and managing the aggregated reservation protocol session. A processor coupled to the storage device executes the one or more routines to pre-allocate the aggregated reservation protocol session and thereafter share the aggregated reservation protocol session among multiple application sessions of individual application sessions. The aggregated reservation protocol session is pre-allocated based upon an estimate of the bandwidth requirements to accommodate the multiple application sessions. The aggregated reservation protocol session is shared by multiplexing, onto the aggregated reservation protocol session, outbound media packets originated by local application/endpoints associated with the application sessions, and demultiplexing, from the aggregated reservation protocol session, inbound media packets originated by remote application/endpoints.

Other features of the present invention will be apparent from the accompanying drawings and from the detailed description that follows.

BRIEF DESCRIPTION OF THE SEVERAL VIEWS OF THE DRAWINGS

Embodiments of the present invention are illustrated by sway of example, and not by way of limitation, in the figures of the accompanying drawings and in which like reference numerals refer to similar elements and in which.

DETAILED DESCRIPTION

Figure 1:
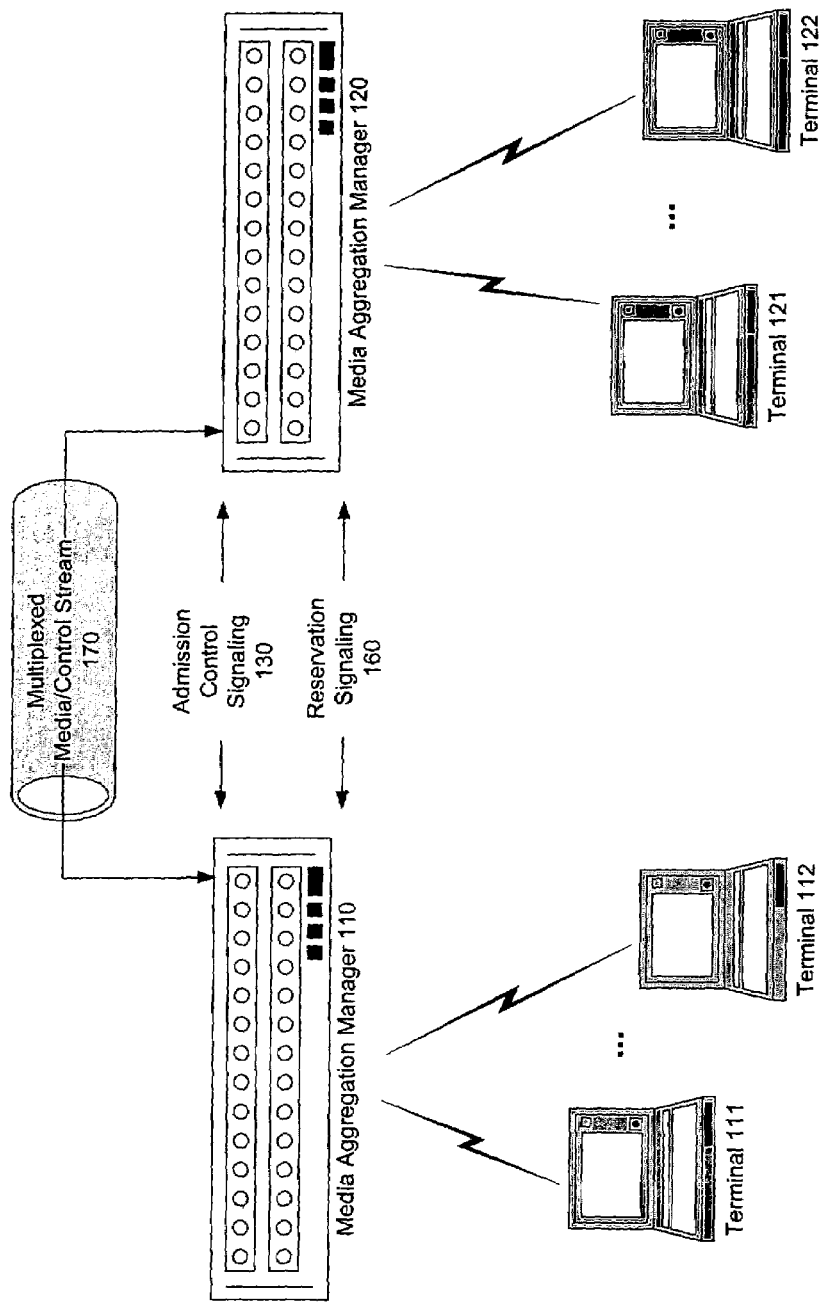
FIG. 1 conceptually illustrates interactions between two media aggregation managers according to one embodiment of the present invention.

Apparatus and methods are described for multiplexing application flows over a pre-allocated bandwidth reservation protocol session. Broadly stated, embodiments of the present invention seek to provide a scalable architecture that enables efficient provisioning of reserved bandwidth for multiple application flows by multiplexing individual application flows over a pre-allocated reservation protocol session. The pre-allocated reservation protocol session preferably takes into consideration current network resources and estimated usage of network resources, such as bandwidth, based upon historical data. For example, the amount of pre-allocated resources may vary due to different loads being offered at different times of day and/or day of week. Additionally, the pre-allocated reservation protocol session may be dynamically adjusted to account for actual usage that surpasses the estimated usage or actual usage that falls below the estimated usage.

According to one embodiment, a more intelligent approach is employed in connection with initiation and maintenance of a large number of reservations. Rather than establishing and maintaining a reservation protocol session for each application flow that requires real-time response, which results in many independent reservation protocol sessions and high overhead, a single reservation protocol session may be pre-allocated and subsequently dynamically shared among the application flows by aggregating the associated media packets and transmitting them over a multiplexed media stream. For example, VoIP services may be provided between many different user communities using pre-allocated RSVP sessions between pairs of distributed media aggregation managers. The media aggregation-managers multiplex outbound voice packets onto the pre-allocated RSVP session and demultiplex inbound voice packet received over the pre-allocated RSVP session, thereby sharing a common RSVP session and reducing the computational resources required by the network to provide real-time response for multiple application flows. Advantageously, in this manner, it becomes feasible to use reservation protocols, such as RSVP, for large numbers of applications that require real-time performance, such as VoIP services.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware and software.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention are described with reference to particular existing signaling, control, and communications protocol standards, such as International Telecommunication Union Telecommunication Standardization Section (ITU-T) Recommendation H.225.0 entitled "Call Signalling Protocols and Media Stream Packetization for Packet-based Multimedia Communication Systems," published February 1998 (hereinafter H.225.0); ITU-T Recommendation H.245 entitled "Control Protocol for Multimedia Communication," published May 1999 (hereinafter H.245); ITU-T Recommendation H.323 entitled "Packet-based Multimedia Communications Systems," published September 1999 (hereinafter H.323); and a particular bandwidth reservation protocol (i.e., RSVP), the present invention is equally applicable to various other signaling, control, communications and reservation protocols. For example, Session Initiation Protocol (SIP) may be employed to create, modify, and terminate application sessions with one or more participants. SIP is described in M. Handley et al., "SIP: Session Initiation Protocol," RFC 2543, Network Working Group, March 1999, which is hereby incorporated by reference.

In addition, for sake of brevity, embodiments of the present invention are described with reference to a specific application (i.e., VoIP) in which individual flows may be multiplexed over a pre-allocated bandwidth reservation protocol session. Nevertheless, the present invention is equally applicable to various other applications that require real-time performance, such as applications based on human interactions (e.g., collaborative software, online/Web collaboration, voice conferencing, and video conferencing), and the like.

Terminology

Brief definitions of terms and phrases used throughout this application are given below.

A "media aggregation manager" may generally be thought of as a network device, such as an edge device at the ingress/egress edges of a user community, or a group of one or more software processes running on a network device that provides application/protocol specific multiplexing/demultiplexing of media traffic onto a pre-allocated reservation protocol session.

A "reservation protocol" generally refers to a protocol that may be employed to communicate information regarding a desired level of service for a particular application flow. An example of an existing bandwidth reservation protocol is RSVP.

A "user community" generally refers to a group of users residing on a common network at a given location. For example, employees on an enterprise network at a given location or users of a particular Internet service provider (ISP) at a given location may represent a user community.

A "reservation protocol session" generally refers to a set of reserved network resources established and maintained between two or more network devices that serve as proxies for application endpoints residing behind the proxies. An example, of a reservation protocol session is an RSVP session between two media aggregation managers.

An "application session" generally refers to a session established and maintained between two or more terminals. According to embodiments of the present invention, multiple application sessions may be multiplexed onto a single reservation protocol session thereby reducing the overhead for establishing and maintaining multiple reservation protocol sessions.

A "terminal" generally refers to a LAN-based endpoint for media transmission, such as voice transmission. Terminals may be capable of executing one or more networked applications programs. An example of a terminal would be a computer system running an Internet telephony application, such as CoolTalk or NetMeeting.

An "application" or "endpoint" generally refers to a software program that is designed to assist in the performance of a specific task, such as Internet telephony, online collaboration, or video conferencing.

An "application flow" generally refers to the data associated with an application session. An example of an application flow is a media stream, such as a continuous sequence of packetized voice data transmitted over a network.

A "tag" generally refers to information that is appended to application generated packets, such as Real-time Transport Protocol (RTP) packets or Real-time Transport Control Protocol (RTCP) packets, that allows the proxy endpoints of the reservation protocol session to transmit encapsulated packets to the appropriate remote application/endpoint (RA). According to one embodiment of the present invention, a tag includes address information, such as the destination network address of the terminal upon which the destination application/endpoint resides. When a media aggregation manager is employed in connection with a transport protocol and control protocol (such as RTP and RTCP) that use different channels or ports for control and data, control and data packets may be multiplexed onto the reservation protocol session as well by including protocol dependent control information. Then, the remote media aggregation manager may strip the tag from the encapsulated packet and determine the appropriate channel/port of the remote application/endpoint on which to forward the resulting packet based upon the additional protocol dependent control information within the tag. Advantageously, in this manner, two layers of multiplexing may be achieved, (1) a first layer that allows identification of the appropriate application at the remote media aggregation manager; and (2) a second layer that specifies a subclass/subprocess within an application.

Media Aggregation Overview

The architecture described herein seeks to resolve scalability problems observed in current reservation protocols. These scalability issues have slowed the adoption of reservation protocols in network environments where multiple applications must be provided with certainty regarding a minimum reserved bandwidth.

FIG. 1 conceptually illustrates interactions between two media aggregation managers 110 and 120 according to one embodiment of the present invention. According to one embodiment, the media aggregation managers 110 and 120 act as reservation protocol proxies on behalf of the terminals 111, 112, 121, and 122. For example, the media aggregation managers 110 and 120 establish and maintain a reservation session, such as an RSVP session, between each other by exchanging reservation signaling messages 160. Subsequently, rather than establishing additional reservation protocol sessions, the media aggregation managers 110 and 120 respond to reservation requests from the terminals 111, 112, 121, and 122 by dynamically allocating the reserved resources, such as bandwidth, associated with the reservation protocol session to corresponding application sessions. In this manner, multiple application sessions may share the reservation session by multiplexing media packets onto the reservation session as described further below.

In this example, a multiplexed media/control stream 170 is established using admission control signaling messages 130. The multiplexed media/control stream 170 is carried over the pre-allocated reservation session between media aggregation manager 110 and media aggregation manager 120. The multiplexed media/control stream 170 represents one way to handle certain transport and control protocol combinations, such as RTP and RTCP, that use different channels or ports for control and data. In alternative embodiments, the reservation protocol session 160 may not need to distinguish between control and data.

While the media aggregation managers 110 and 120 may be discussed as if they are autonomous network edge devices, it should be kept in mind that according to various embodiments of the present invention some or all of the functionality of a media aggregation manager might be integrated with existing network devices, such as bridges, routers, switches, and the like. Additionally, while only a single aggregated reservation protocol session between two media aggregation managers 110 and 120 is described in connection with the present example, it should be appreciated that each media aggregation manager 110 and 120 may support multiple, heterogeneous reservation protocol sessions capable of providing heterogeneous application flows among multiple user communities. Importantly, according to embodiments of the present invention, regardless of the number of terminals or application/endpoints, application flows may be provided with reserved bandwidth between any and all pairs of terminals of N user communities by establishing and sharing no more than N2 reservation protocol sessions.

Network Device Overview

Figure 2:
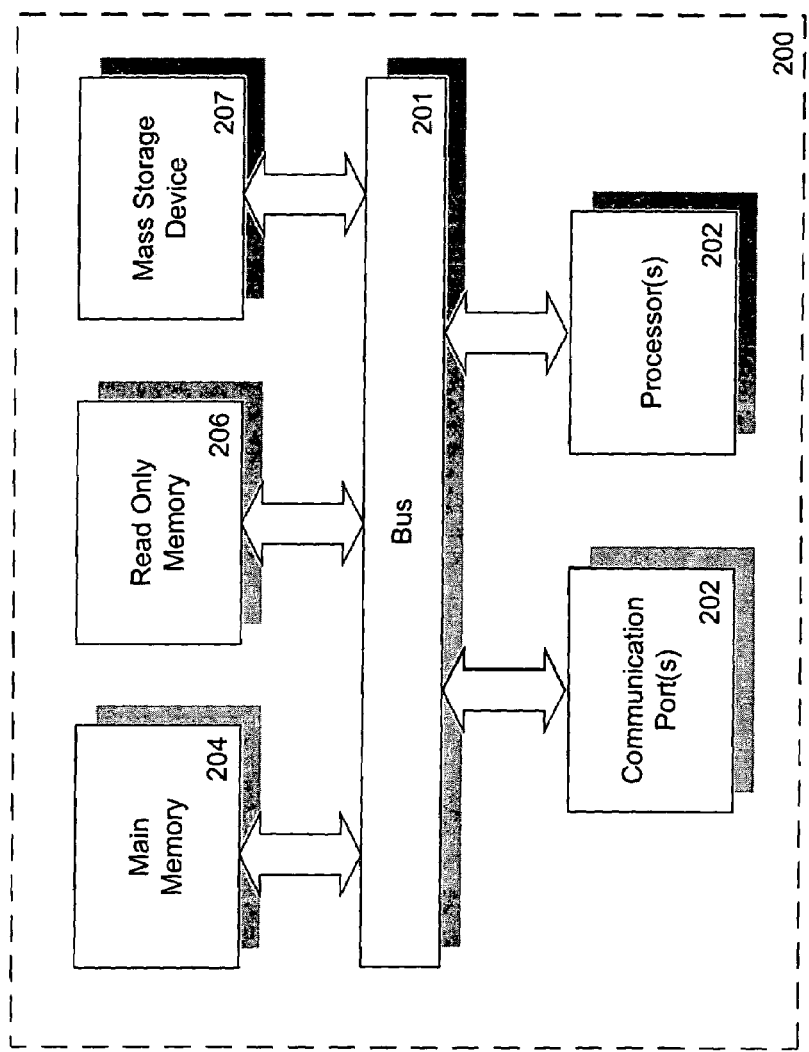
FIG. 2 is an example of a network device in which one embodiment of the present invention may be implemented.

An exemplary machine in the form of a network device 200, representing an exemplary media aggregation manager 110, in which features of the present invention may be implemented will now be described with reference to FIG. 2. In this simplified example, the network device 200 comprises a bus or other communication means 201 for communicating information, and a processing means such as one or more processors 202 coupled with bus 201 for processing information. Networking device 200 further comprises a random access memory (RAM) or other dynamic storage device 204 (referred to as main memory), coupled to bus 201 for storing information and instructions to be executed by processor(s) 202. Main memory 204 also may be used for storing temporary variables or other intermediate information during execution of instructions by processor(s) 202. Network device 200 also comprises a read only memory (ROM) and/or other static storage device 206 coupled to bus 201 for storing static information and instructions for processor 202. Optionally, a data storage device (not shown), such as a magnetic disk or optical disc and its corresponding drive, may also be coupled to bus 201 for storing information and instructions.

One or more communication ports 225 may also be coupled to bus 201 for allowing various local terminals, remote terminals and/or other network devices to exchange information with the network device 200 by way of a Local Area Network (LAN), Wide Area Network (WAN), Metropolitan Area Network (MAN), the Internet, or the public switched telephone network (PSTN), for example. The communication ports 225 may include various combinations of well-known interfaces, such as one or more modems to provide dial up capability, one or more 10/100 Ethernet ports, one or more Gigabit Ethernet ports (fiber and/or copper), or other well-known interfaces, such as Asynchronous Transfer Mode (ATM) ports and other interfaces commonly used in existing LAN, WAN, MAN network environments. In any event, in this manner, the network device 200 may be coupled to a number of other network devices, clients and/or servers via a conventional network infrastructure, such as a company's Intranet and/or the Internet, for example.

Media Aggregation Manager

Figure 3:
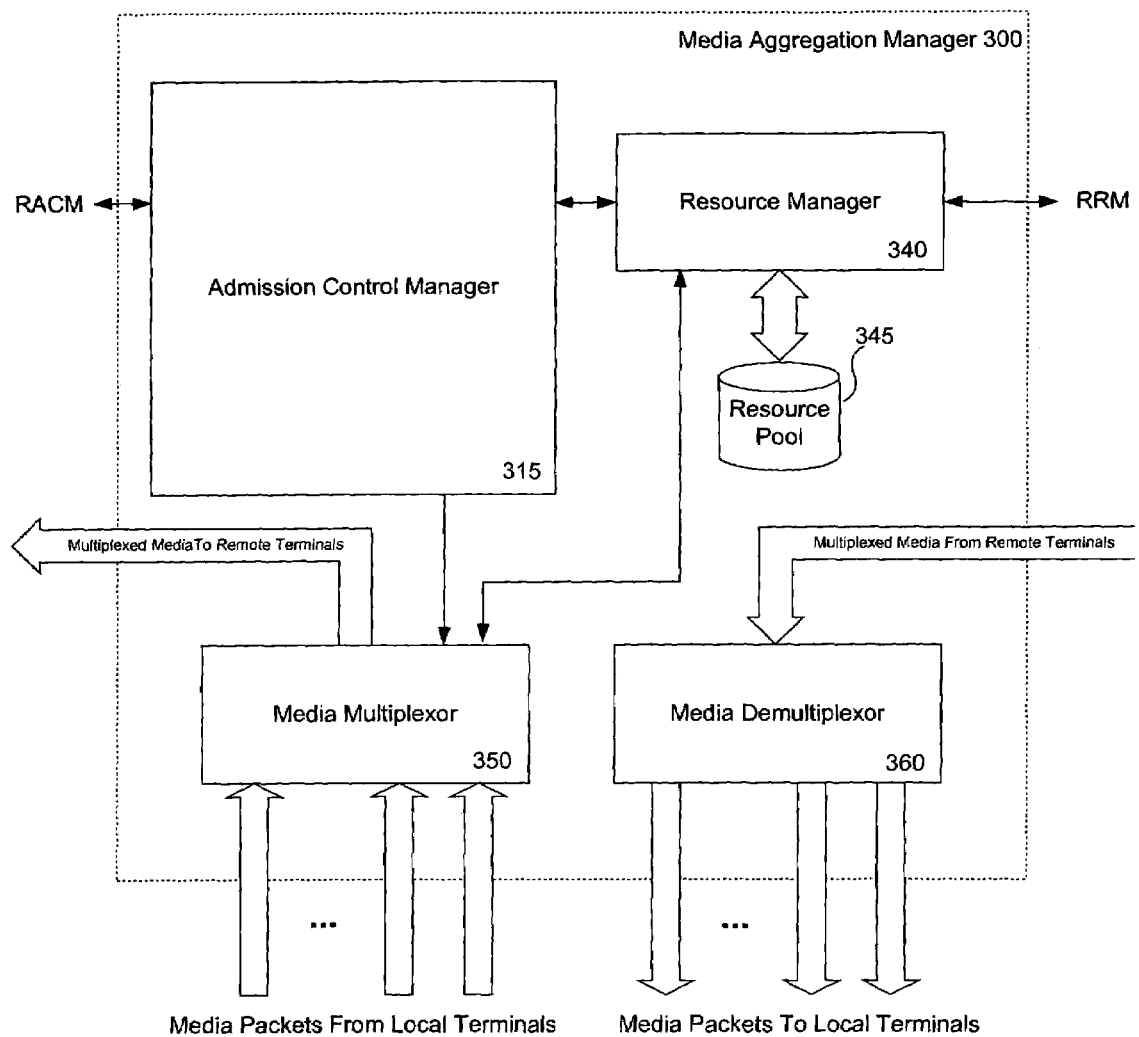
FIG. 3 is a high-level block diagram of a media aggregation manager according to one embodiment of the present invention.

FIG. 3 is a high-level block diagram of a media aggregation manager according to one embodiment of the present invention. By interconnecting a plurality of distributed media aggregation managers, such as media aggregation manger 300, an architecture is provided for multiplexing several application flows (e.g., VoIP calls) over a pre-allocated reservation protocol session, such as a pre-allocated RSVP pipe. Advantageously, the multiplexing of application flows reduces the computational resources required by the network to provide reserved bandwidth, e.g., guaranteed bandwidth, for multiple application flows. The source media aggregation manager receives media packets from its local terminals and transmits multiplexed media to the destination aggregation manager. The destination aggregation manager receives the multiplexed media and routes media packets to the appropriate terminal(s) of its local terminals.

In this example, the media aggregation manger 300 includes an application/protocol specific media multiplexor 350, an application/protocol specific media demultiplexor 360, an admission control manager 315, a generic resource manager 340, and a resource pool 345. In a software implementation, instances of the media multiplexor 350, media demultiplexor 360, and admission control manager 315 may be created for each particular application/protocol needed to allow communications between terminals of the geographically diverse user communities. Importantly, it should be appreciated that the particular partitioning of functionality described with reference to this example is merely illustrative of one or many possible allocations of functionality.

According to the embodiment depicted, the resource manager 340 establishes and maintains one or more pre-allocated reservation protocol sessions between the local media aggregation manager and one or more remote media aggregation managers. The resource manager 340 optionally interfaces with a centralized entity (not shown) that provides information relating to the characteristics and estimated amount of resources for the pre-allocated reservation protocol sessions. Alternatively, a network administrator may provide information to the resource manager 340 relating to desired characteristics of the pre-allocated reservation protocol sessions. The resource manager 340 also tracks active application sessions for each reservation protocol session and the current availability of resources for each reservation protocol session in the resource pool 345.

The admission control manager 315 interfaces with local terminals (not shown) associated with a particular user community, the media multiplexor 350, the resource manager 340, and one or more other remote media aggregation managers associated with other user communities. Importantly, in one embodiment, the media multiplexor 350 hides the details of how reserved resources are internally allocated and managed, thereby allowing the local terminals to use existing reservation protocols, such as RSVP, without change. The media multiplexor 350 receives media packets from the local terminals and appropriately translates/encapsulates the packets in accordance with the aggregation technique described further below. When application flows are established and terminated, the admission control manager 315 interfaces with the resource manager 340 to allocate and deallocate resources, respectively.

The media demultiplexor 360 interfaces with the local terminals to supply with media packets by demultiplexing their respective application flows from the pre-allocated reservation protocol session.

The admission control manager 315 exchanges admission control signaling messages with remote admission control managers and configures the local application/endpoint (LA) to send media to the media multiplexor 350 after an application session has been established with a remote media aggregation manager. For VoIP using the H.323 protocol, the admission control manager 315 may include RAS, call control, and call signaling processing.

In operation, two resource managers cooperate to establish a pre-allocated reservation protocol session between a local media aggregation manager (LMAM) and a remote media aggregation manager (RMAM). The resource managers make a reservation that is large enough to accommodate the anticipated load offered by applications that need to communicate over the reservation protocol session. Subsequently, a local media multiplexor (LMM) associated with the LMAM provides admission control for application flows between one or more terminals of the LMAM and the RMAM with the assistance of the local and remote admission control managers and the local and remote resource managers. If sufficient resources, such as bandwidth, are available over the pre-allocated reservation protocol session, then the local media multiplexor multiplexes the application flows over the pre-allocated reservation protocol session. On the receiving end, the remote media demultiplexor (RMD) demultiplexes the application flows and sends them to their intended destinations. The typical admission control manager 315 will be a player in the path of the application protocol for setting up the connection between two or more application endpoints; hence, it may be instrumented to modify the path of the media packets to flow through the LMM and remote media multiplexor (RMM).

In brief, after an application session has been associated with the pre-allocated reservation protocol session, the application/endpoints may use a transport protocol and/or a control protocol, such as RTP and/or RTCP to exchange media packets between them. The media packets may carry various types of real-time data, such as voice, video, multimedia, or other data for human interactions or collaboration. Media packets from a data source are tagged by the local media multiplexor 350 and sent over the reserved path to one or more media demultiplexors 360 corresponding to the data destination. As illustrated below, the media demultiplexor 360 strips the tag before the media packets are forwarded and uses the tag information to determine the eventual destination of the data packet.

From the perspective of the local terminals, they are establishing and using reservation protocol sessions for each application flow. However, in reality, the media aggregation manger 300 shares the pre-allocated reservation protocol session among multiple application flows.

As will be described further below, a specific example of the use of this architecture is in connection with the use of the H.323 protocol for VoIP calls. Typically, an H.323 Gatekeeper is used by endpoints to help in address resolution, admission control etc. So, for the H.323 protocol, the gatekeeper is a convenient place for the media multiplexor 350 to reside.

Note that in this description, in order to facilitate explanation, the media aggregation manager 300 is generally discussed as if it is a single, independent network device or part of single network device. However, it is contemplated that the media aggregation manager 300 may actually comprise multiple physical and/or logical devices connected in a distributed architecture; and the various functions performed may actually be distributed among multiple network devices. Additionally, in alternative embodiments, the functions performed by the media aggregation manager 300 may be consolidated and/or distributed differently than as described. For example, any function can be implemented on any number of machines or on a single machine. Also, any process may be divided across multiple machines.

Sharing a Pre-Allocated Reservation Protocol Session

Figure 4:
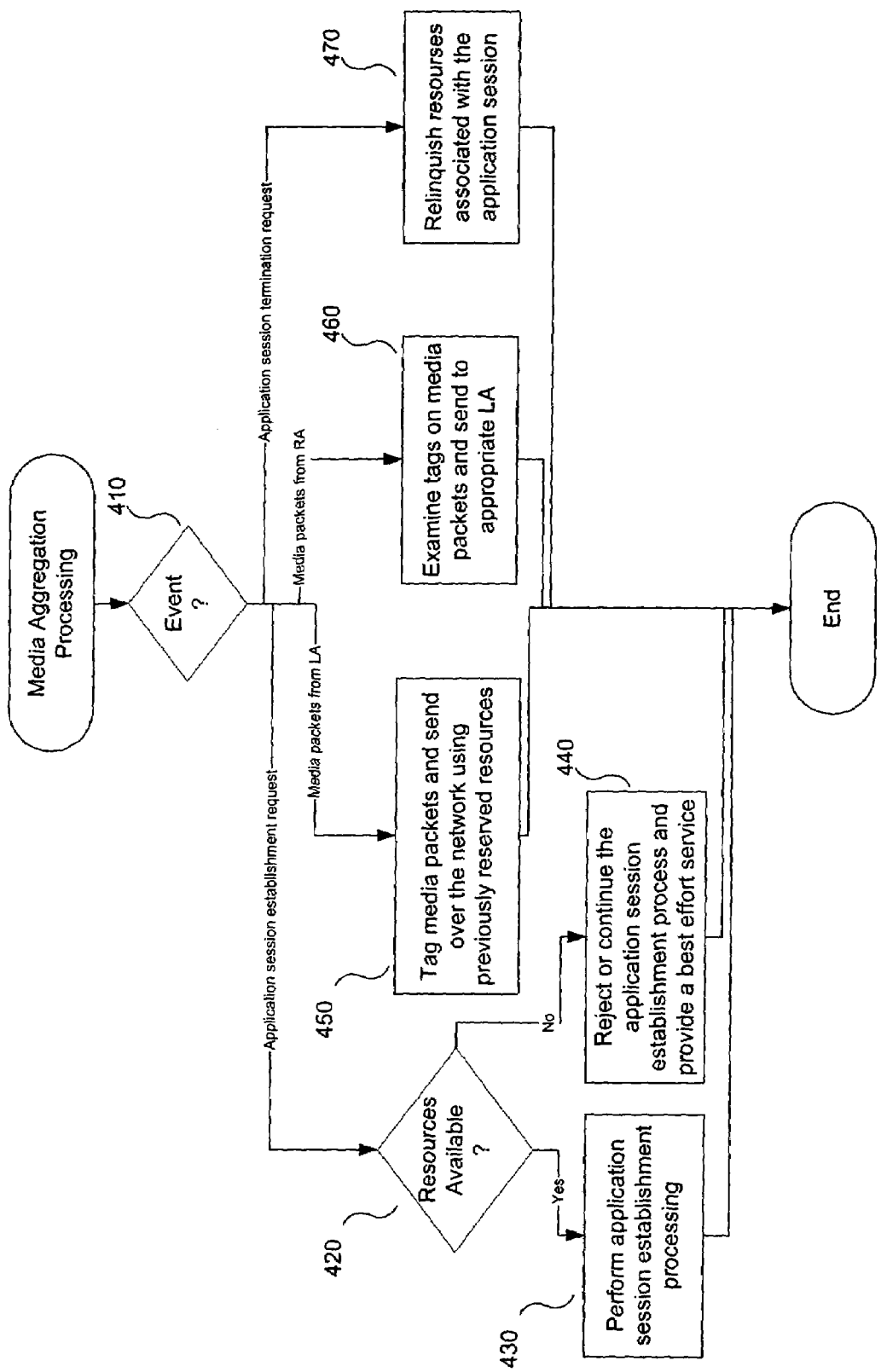
FIG. 4 is a simplified, high-level flow diagram illustrating media aggregation processing according to one embodiment of the present invention.

FIG. 4 is a simplified, high-level flow diagram illustrating media aggregation processing according to one embodiment of the present invention. In one embodiment, the processing blocks described below may be performed under the control of a programmed processor, such as processor 202. However, in alternative embodiments, the processing blocks may be fully or partially implemented by any programmable or hard-coded logic, such as Field Programmable Gate Arrays (FPGAs), TTL logic, or Application Specific Integrated Circuits (ASICs), for example.

In this example, it is assumed that, prior to the start of the media aggregation processing, a reservation protocol session has been established. The pre-allocated reservation protocol session preferably takes into consideration current network resources and estimated usage of network resources, such as bandwidth, based upon historical data. For example, the amount of pre-allocated resources may vary due to different loads being offered at different times of day and/or day of week.

At any rate, at decision block 410, the media aggregation manager 300 determines the type of event that has occurred. If the event represents the receipt of an application session establishment request from a local terminal, then processing proceeds to decision block 420. If the event represents the receipt of media packets from a local application/endpoint, then processing continues with decision block 450. If the event represents the receipt of a media packet from a remote application/endpoint, then control passes to processing block 460. If the event represents the receipt of an application session termination request, then processing continues with processing block 470.

At decision block 420, a determination is made whether resources are available to meet the needs identified in the application session establishment request. For example, the resource manager 340 may determine if sufficient bandwidth is available on an appropriate pre-allocated reservation protocol session by comparing a minimum bandwidth specified in the application session establishment request to a bandwidth availability indication provided by the resource pool 345.

If adequate resources are available to provide the requestor with the minimum resources requested, processing continues with processing block 430 where application session establishment processing is performed. Application session establishment processing is described below with reference to FIG. 5. Otherwise, if there are insufficient resources to accommodate the application session establishment request, processing branches to processing block 440. At processing block 440, the media aggregation manager 300 may reject the application session establishment request. Alternatively, the media aggregation manager 300 may continue the application session establishment process and provide a best effort service for the request (without the use of pre-allocated resources).

At processing block 450, media packets received from a local application/endpoint are tagged and sent over the network to the destination using the previously reserved resources (e.g., the pre-allocated reservation protocol session). The tagging and multiplexing of media packets onto the pre-allocated reservation protocol session will be discussed in detail below.

At processing block 460, media packets received from a remote application/endpoint are forwarded to the appropriate local application/endpoint. For example, the packets may be sent to the appropriate local application/endpoint based upon an examination of the tag information added by the remote media aggregation manager.

At processing block 470, in response to an application session termination request, resources allocated to this application session are relinquished and made available for other application sessions. For example, the resource manager 340 may update an indication of available resources in the resource pool 345 for the pre-allocated reservation protocol session associated with the terminated application session.

Figure 5:
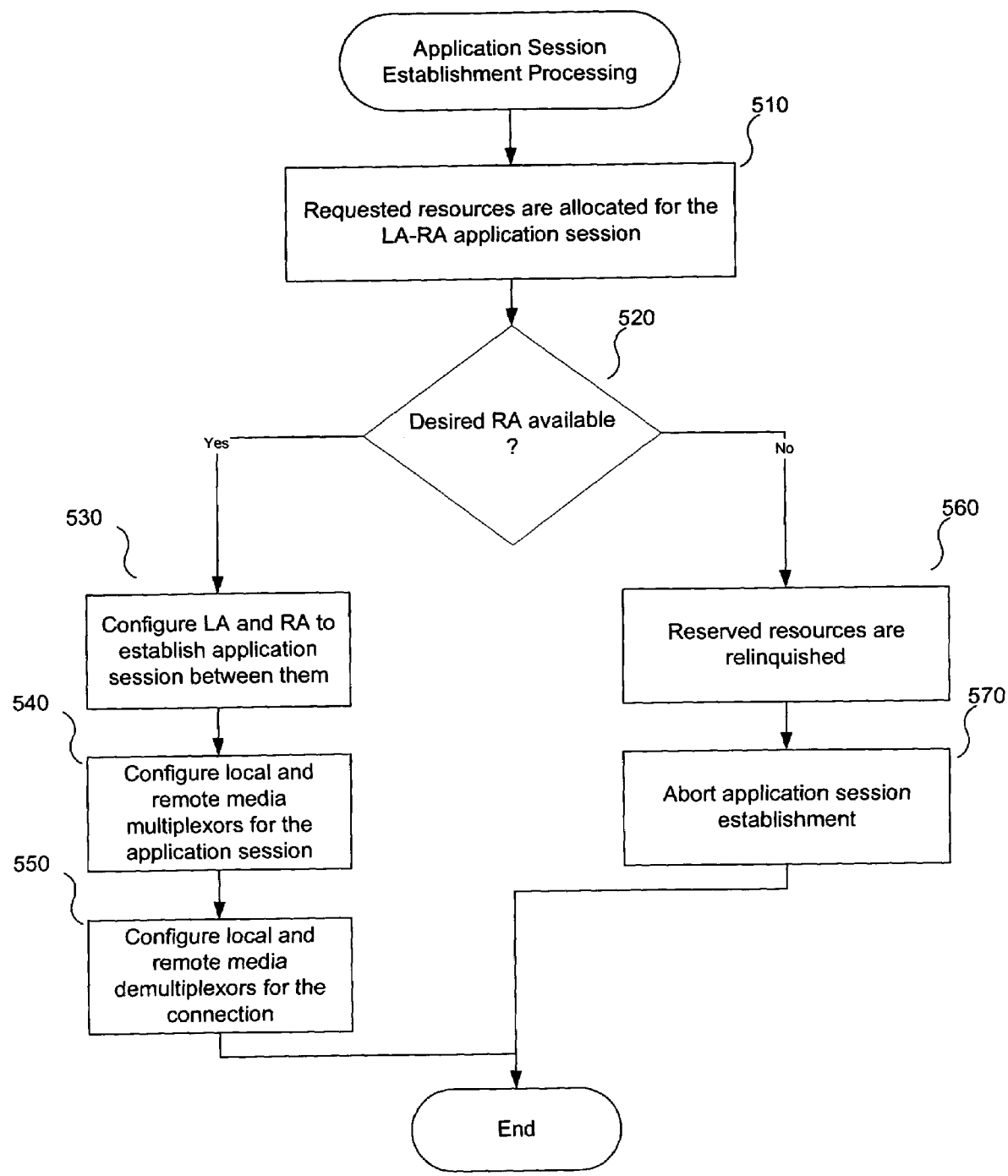
FIG. 5 is a simplified, high-level flow diagram illustrating application session establishment processing according to one embodiment of the present invention.

FIG. 5 is a simplified, high-level flow diagram illustrating application session establishment processing according to one embodiment of the present invention. In the present example, application session establishment processing begins with processing block 510. At processing block 510, the requested resources are allocated to the application session. According to one embodiment, the local resource manager 340 creates a new application session entry, in the resource pool 345, containing an indication of the resources granted to the application session.

At decision block 520, a determination is made whether the desired remote application/endpoint is available to participate in the application session. If so, processing proceeds to processing block 530; otherwise, processing branches to processing block 560.

Assuming the desired remote application/endpoint is available to participate in the application session, then at processing block 530, the local application/endpoint and the remote application/endpoint are configured to send media packets associated with the application session to the local and remote media multiplexors, respectively.

At processing blocks 540 and 550, the local and remote media multiplexors and demultiplexors are configured in accordance with the application session. For example, as described further below, a lookup table may be maintained by the media multiplexor 350 or media demultiplexor 360 to translate the source network address of the local application/endpoint to the destination network address of the remote application/endpoint.

Figure 6:
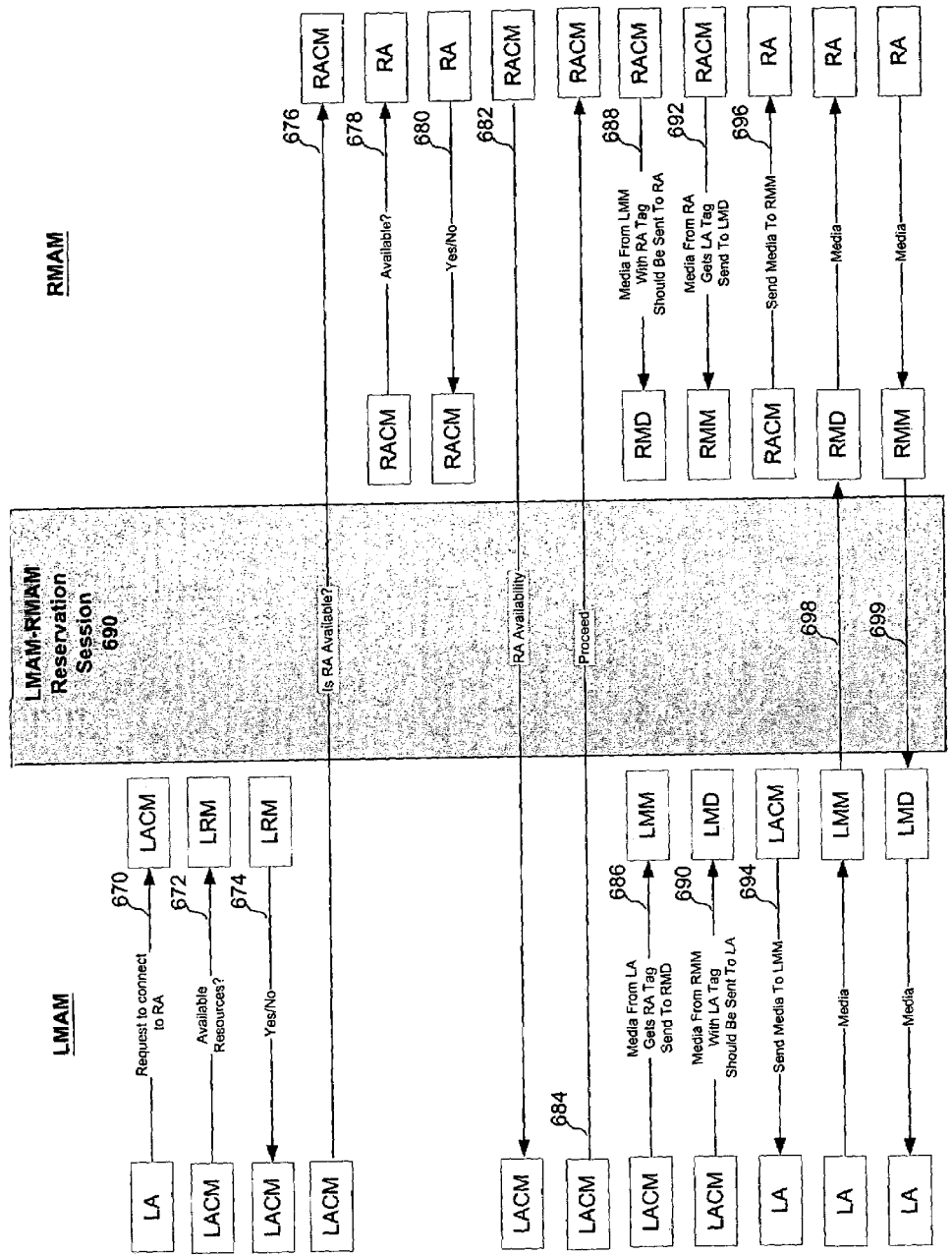
FIG. 6 illustrates interactions among local and remote media aggregation manager functional units according to one embodiment of the present invention.

FIG. 6 illustrates interactions among local and remote media aggregation manager functional units according to one embodiment of the present invention. In general, the media aggregation managers abstract the true application session endpoints from each other and serve as proxies for their respective local applications/endpoints. The media aggregation managers accomplish this by intercepting messages originating from their respective local applications/endpoints and modifying the messages to make themselves appear as the actual application flow originators/recipients.

In this example, for simplicity, it is assumed that a single local application/endpoint (LA) is establishing an application session with a single remote application/endpoint (RA) over a pre-allocated reservation protocol session 690 between a local media aggregation manager (LMAM) geographically proximate to the LA and a remote media aggregation manager (RMAM) geographically proximate to the RA.

The LA transmits a request to connect to the RA to the LMAM (670). The LACM inquires of the local resource manager (LRM) whether sufficient resources are currently available to accommodate the LA's request (672). The LRM indicates the availability or inavailability of available resources to the LACM (674).

Assuming, sufficient resources are available to provide the reserved resources the LA needs for the requested connection to the RA, then the LACM asks the RACM if the RA is available (676). In response to the LACM's request, the RACM queries the RA to determine its present availability (678). The RA indicates whether or not it is currently available to participate in an application session (680).

Assuming, the RA indicates that it is available, then the RACM communicates the RA's availability to the LACM (682). In response to the availability of the RA, the LACM directs the RACM to proceed with establishment of a connection between the LA and RA.

Having determined that a connection is feasible, the LACM and RACM proceed to configure their media multiplexors and media demultiplexors for the LA-RA connection. The LACM configures the local media multiplexor (LMM) to tag media originated from the LA for routing to the RA and to send the resulting encapsulated media packets to the remote media demultiplexor (RMD) (686). The LACM further configures the local media demultiplexor (LMD) to forward media packets that are received from the RMM and tagged as being associated with the LA-RA connection to the LA (690).

Similarly, the RACM configures the remote media demultiplexor (RMD) to forward media packets that are received from the LMM and tagged as being associated with the LA-RA connection to the RA (688). The RACM also configures the remote media multiplexor (RMM) to tag media originated from the RA for routing to the LA and to send the resulting encapsulated media packets to the local media demultiplexor (LMD) (692).

Once the media multiplexors and media demultiplexors have been appropriately configured for the LA-RA connection, the LACM and the RACM inform their application/endpoints to commence transmission of media to the LMM and the RMM, respectively. Thus, the media aggregation managers appear to their respective application/endpoints as the actual application flow originators/recipients and subsequently serve as proxies for their respective application/endpoints.

During media transmission between the LA and the RA 698 and 699, media packets originated by the LA are sent to the LMM, which encapsulates the media packets by appending a tag appropriate for the LA-RA connection and forwards the encapsulated packets over the pre-allocated reservation protocol session 690 to the RMD. The RMD determines the RA is the intended destination based upon the tag, removes the tag, and forwards the media packet to the RA. Media packets originated by the RA are sent to the RMM, which encapsulates the media packets by appending a tag appropriate for the LA-RA connection and forwards the encapsulated packets over the pre-allocated reservation protocol session 690 to the LMD. The LMD determines the LA is the intended destination based upon the tag, removes the tag, and forwards the media packet to the LA.

An Exemplary H.323 VoIP Implementation

H.323 is basically an umbrella that covers several existing protocols, including but not limited to H.225.0, and H.245. The later two protocols are used to establish call connection, and capability information between two endpoints. Once this information is exchanged, the endpoints may use RTP and RTCP to exchange voice (and multi-media) information between them.

H.323 suggests that RTP/RTCP should be established between two endpoints (caller/receiver) for each call. Consequently, in order to provide Quality Of Service (QoS) for each call using a protocol like RSVP would mean that every endpoint pair (caller/receiver) for every H.323 call would need to establish RSVP between one another. This would create a huge amount of overhead on the endpoint and adversely affect network resources as RSVP "soft states" must be maintained for the life of the call. This quickly becomes a tremendous scalability issue, since as number of simultaneous calls increase, so do the RSVP "soft state" maintenance messages between endpoints, and every router involved in the transmitting RTP/RTCP data stream.

The media aggregation manager 300 described herein seeks to provide a clean, and scalable solution for this problem, while providing the same QoS as if two individual endpoints had used a reservation protocol session, such as RSVP, between them. Briefly, according to the described H.323 VoIP embodiment, the H.323 endpoints (callers/receivers) need not have knowledge of how to establish and maintain RSVP sessions. Instead, the media aggregation managers establish one or more RSVP "pipes" between them that can accommodate several (expected) voice calls. These RSVP pipes are created as the media aggregation managers are started and the RSVP pipes are maintained between them. This immediately reduces the amount of RSVP state processing in the network. The RSVP pipes between media aggregation managers may be created based upon an educated estimate of the number of calls that are expected between user communities being managed by these media aggregation managers. Since RSVP by nature is established, between a specific IP address/port pair and since the pipes are pre-created between media aggregation managers, all voice traffic (RTP/RTCP) originates and terminates between media aggregation managers at the media multiplexor 350 and the media demultiplexor 360, respectively.

In this manner, according to one embodiment, the "local" media aggregation manager appears to an H.323 voice application caller as its intended receiver. The H.323 endpoints make calls to the media multiplexors of the local media aggregation managers without realizing the local media aggregation managers are not really the final destination. The local media aggregation manager calls the remote media aggregation manager and passes the RTP/RTCP voice data to it. The remote media aggregation manager receives the voice data and sends it the "real" receiver while hiding all mutiplexing details from both the caller and the receiver. However, as the voice data is actually exchanged between media aggregation managers over the network it gets RSVP treatment, reserved bandwidth, and QoS. Advantageously, this solution serves as a surrogate to route calls over the pre-created RSVP pipes eliminating QoS processing by endpoints, without any deviations from each involved standard protocol.

Figure 7:
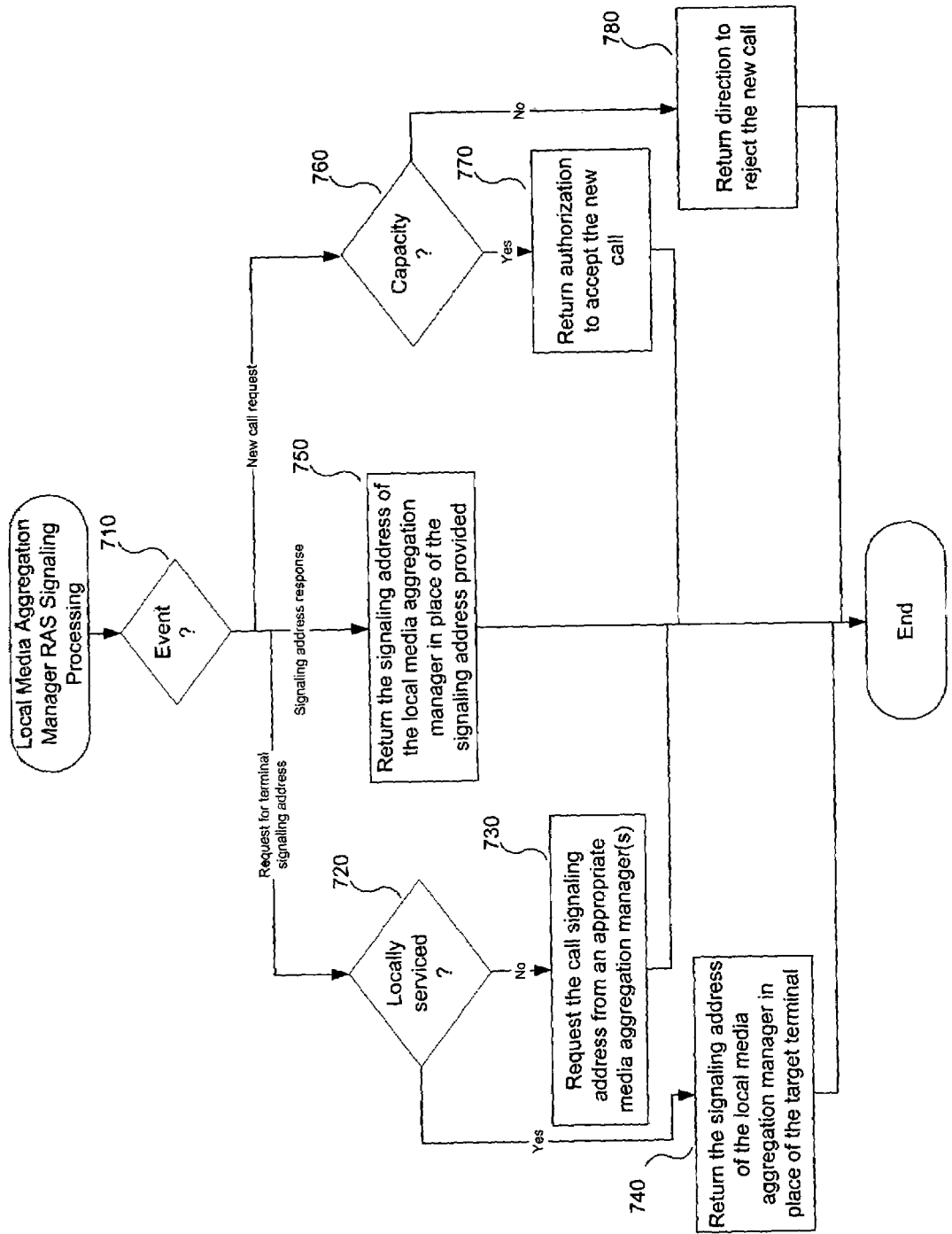
FIG. 7 is a flow diagram illustrating Registration, Admission, Status (RAS) signaling processing according to one embodiment of the present invention.

Referring now to FIG. 7, a flow diagram illustrating exemplary Registration, Admission, Status (RAS) signaling processing will now be described. At decision block 710, the appropriate processing path is determined based upon the triggering event. If the event is a request for a terminal's signaling address then processing proceeds to decision block 720. If the event represents a signaling address response, then control flow branches to processing block 750. However, if the event is a new call request, then processing continues with decision block 760.

At decision block 720, in response to a request for a terminal signaling address, a determination is made whether or not the terminal is locally serviced. If it is determined that the terminal is not serviced by the media aggregation manager 300, then processing continues with processing block 730; otherwise processing proceeds to processing block 740.

At processing block 730, the media aggregation manager 300 requests the call signaling address from an appropriate remote media aggregation manager. For example, the local media aggregation manager may transmit a multicast message or a directed broadcast to locate the appropriate remote media aggregation manager that services the desired terminal.

At processing block 740, the media aggregation manager 300 returns its own signaling address rather than the signaling address of the locally serviced terminal. In this manner, subsequent call signaling and control signaling is routed through the local media aggregation manager rather than letting the locally service terminal handle this signaling directly.

At processing block 750, in response to a signaling address response, the media aggregation manager 300, as above, returns its signaling address in place of the signaling address of the locally serviced terminal to abstract call and control signaling from the locally serviced terminal.

At decision block 760, in response to a new call request on the RAS channel of the media aggregation manager 300, a determination is made whether there is capacity for the new call. For example, the local resource manager verifies whether the reservation protocol session over which the new call will be multiplexed can accommodate the additional bandwidth requirements of the new call. At any rate, if the local resource manager determines that the reservation protocol session has adequate resources for the new call, then processing continues to processing block 770. Otherwise, control flows to processing block 780.

At processing block 770, the media aggregation manager 300 returns an indication that the new call can be accepted. At processing block 780, the media aggregation manager 300 returns direction to reject the new call.

Figure 8:
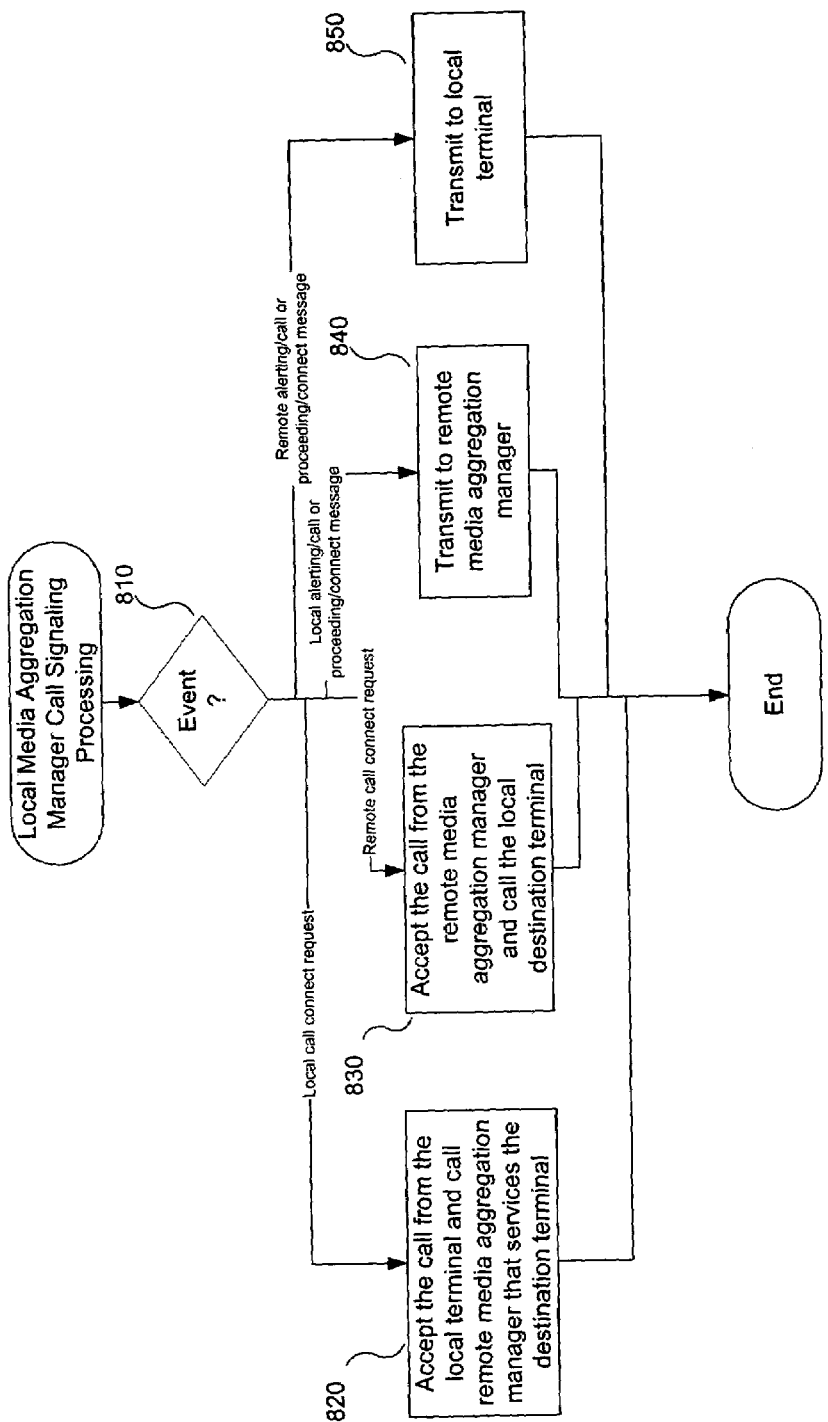
FIG. 8 is a flow diagram illustrating call signaling processing according to one embodiment of the present invention.

FIG. 8 is a flow diagram illustrating call signaling processing according to one embodiment of the present invention. At decision block 810, the appropriate processing path is determined based upon the event that has triggered the call signaling processing tread. If the event is a local call connect request, the processing proceeds to processing block 820. If the event represents a remote call connect request, then control flow branches to processing block 830. If the event is a local alerting/call or proceeding/connect message, then processing continues with processing block 840. However, if the event is a remote alerting/call or proceeding/connect message, the processing proceeds with processing block 850.

At processing block 820, in response to a local call connect request, the media aggregation manager 300 accepts the call from the local terminal and calls the remote media aggregation manager that services the destination terminal. In this manner, the local media aggregation manager poses as the intended receiver to its local terminals that are callers.

At processing block 830, in response to a remote call connect request, the media aggregation manager 300 arts the call from the remote media aggregation manager and calls the intended recipient, e.g., one of the terminals serviced by the local media aggregation manager. In this manner, the local media aggregation manager poses as a caller to its local terminals that are receivers.

At processing block 840, in response to a local alerting/call or proceeding/connect message, the local media aggregation manager relays the message to the appropriate remote media aggregation manager(s).

At processing block 850, in response to a remote alerting/call or proceeding/connect message, the local media aggregation manager relays the message to the appropriate local terminal(s). After processing block 850, call signaling is complete and control protocol signaling (e.g., H.245) can begin.

Figure 9:
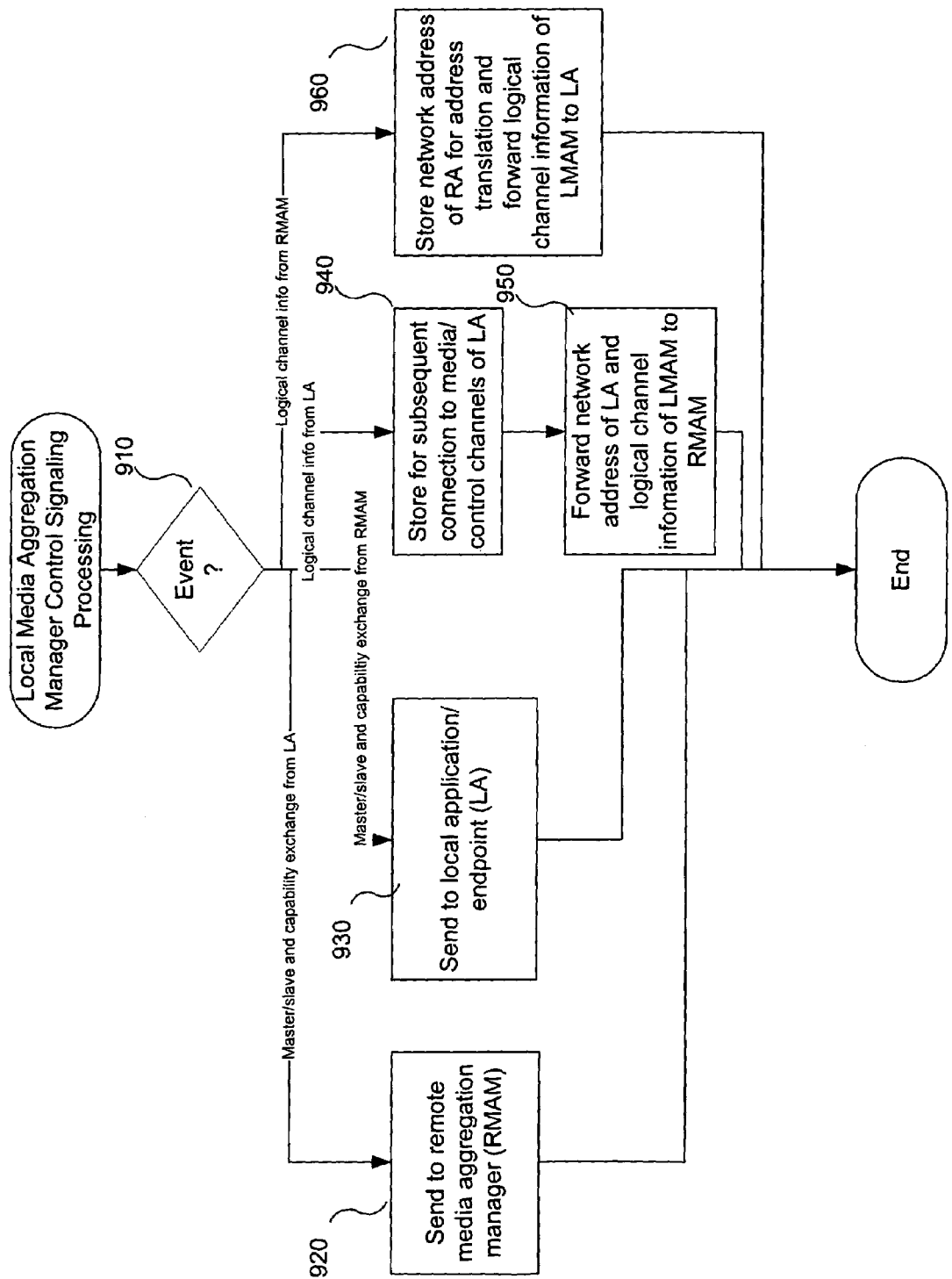
FIG. 9 is a flow diagram illustrating control signaling processing according to one embodiment of the present invention.

FIG. 9 is a flow diagram illustrating control signaling processing according to one embodiment of the present invention. At decision block 910, the appropriate processing path is determined based upon the event that has triggered the control signaling processing tread. If the event is receipt of a master/slave and capability exchange from a local application/endpoint, the processing proceeds to processing block 920. If the event represents receipt of a master/slave and capability exchange from a remote media aggregation manager, then control flow branches to processing block 930. If the event is receipt of logical channel information from a local application/endpoint, then processing continues with processing block 940. However, if the event is reception of logical channel information from a remote media aggregation manager, the processing proceeds with processing block 950.

At processing block 920, the master/slave and capability exchange is transmitted to the remote media aggregation manager.

At processing block 930, the master/slave and capability exchange is transmitted to the local application/endpoint.

At processing block 940, the logical channel information from the local application/endpoint is stored in anticipation of making a connection with the media and/or control channels of the local application/endpoint. At processing block 950, the LMAM forwards its own logical channel information to the RMAM. Additionally, the network address of the LA is sent to the RMAM.

At processing block 960, the network address of the RA is stored in a lookup table for address translation and the logical channel information of the LMAM is forwarded to the LA.

Figure 10:
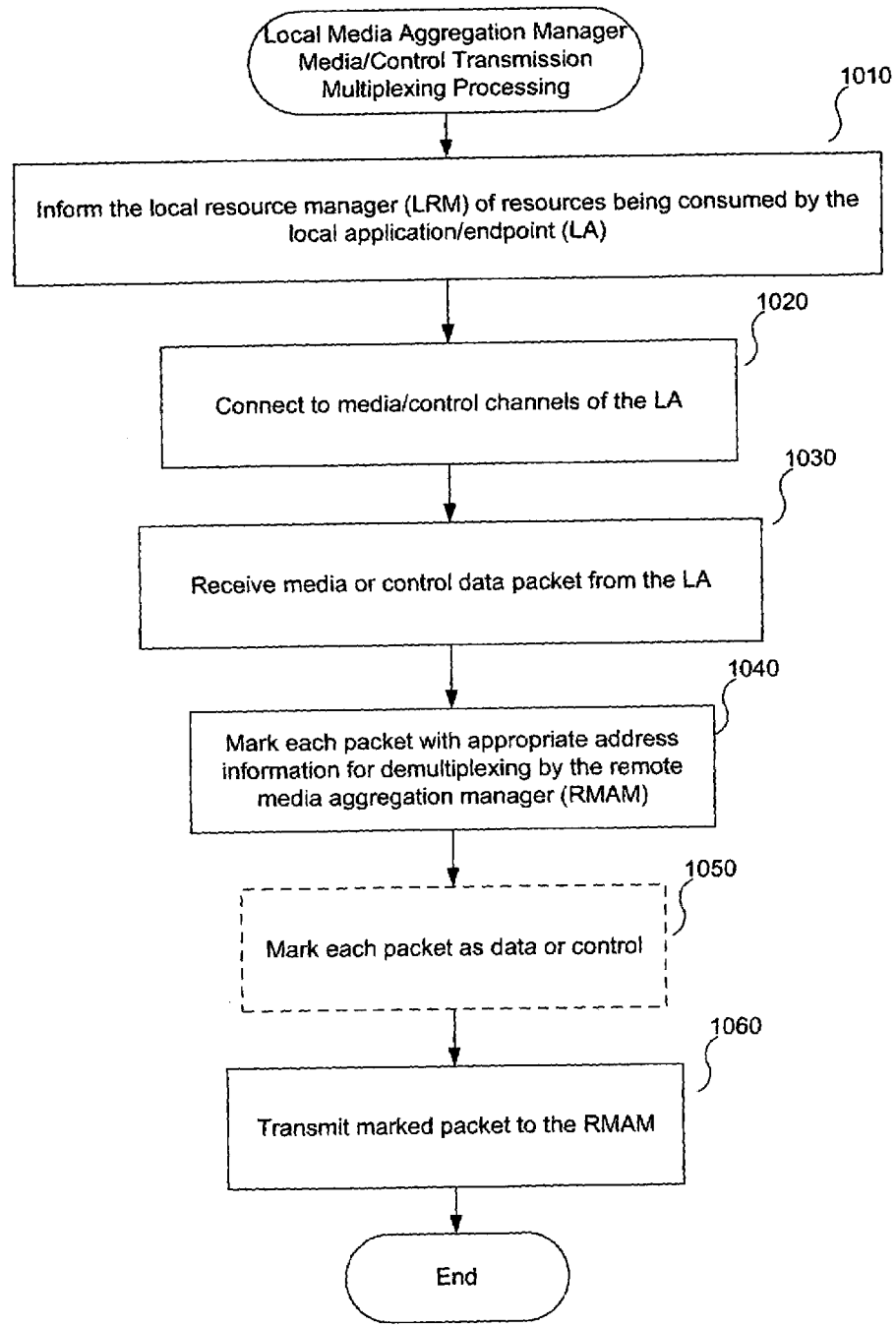
FIG. 10 is a flow diagram illustrating media/control transmission multiplexing processing according to one embodiment of the present invention.

FIG. 10 is a flow diagram illustrating media/control transmission multiplexing processing according to one embodiment of the present invention. At processing block 1010, the local media multiplexor reports the resources being consumed by the local application/endpoint to the local resource manager.

At processing block 1020, the media aggregation manager 300 connects to the media and/or control channels of the local application/endpoint.

At processing block 1030, media and control data packets are generated by the local application/endpoint and received by the local media multiplexor. The media multiplexor 350 takes packets coming from either the control or media channels of the local application/endpoint and sends them to the appropriate remote media aggregation manager(s). According to this example, the media multiplexor 350 marks the outbound packets with appropriate address information (referred to as a "tag") for demultiplexing at the remote media aggregation manager. The tag is typically appended to transport protocol packets, such as TCP or RTP packets, to allow the media multiplexor 350 to direct packets to the appropriate remote application/endpoint. According to one embodiment, the tag includes address information, such as the destination network address associated with the remote application/endpoint. The destination network address may be determined with reference to a lookup table that allows translation between the source network address associated with the local application/endpoint and the destination network address associated with the remote application/endpoint. Alternatively, a lookup table may be maintained on the media demultiplexor 360 and the tag would include the source network address associated with the local application/endpoint. Then, the source network address would be used by the remote media demultiplexor to determine how to route the inbound packet to the appropriate remote application/endpoint.

When different channels or ports are used for transport and control protocols (such as RTP and RTCP), then the tag may also include additional protocol dependent control information to allow multiplexing of data and control packets onto the reservation protocol session. Therefore, at optional processing block 1050, each outbound packet may additionally be marked as control or data to allow the remote media aggregation manager to determine the appropriate channel/port of the remote application/endpoint on which to forward the packet.

Finally, at processing block 1060, the marked packet is transmitted to the appropriate remote media aggregation manager(s).

Figure 11:
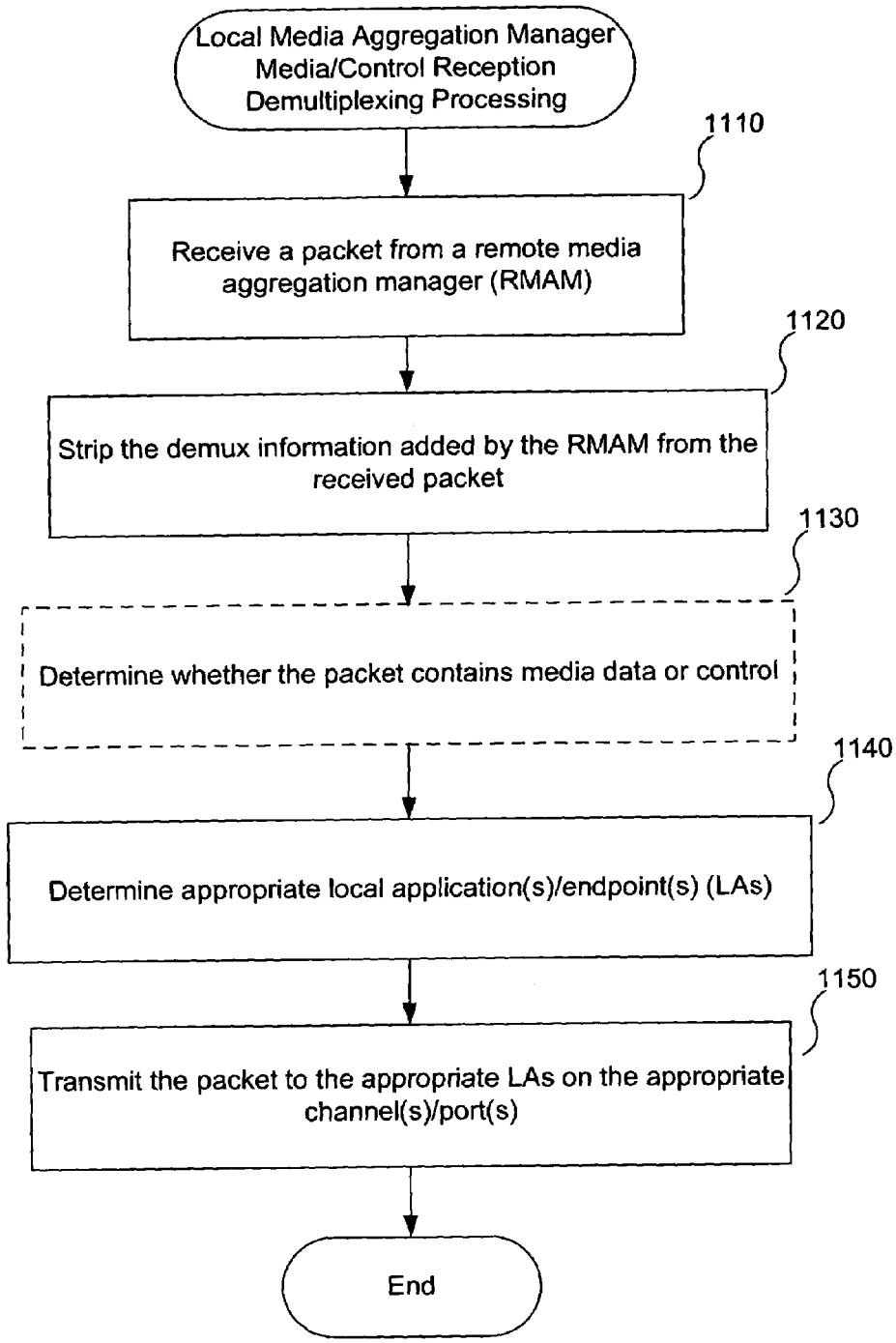
FIG. 11 is a flow diagram illustrating media/control reception demultiplexing processing according to one embodiment of the present invention.

FIG. 11 is a flow diagram illustrating media/control reception demultiplexing processing according to one embodiment of the present invention. At processing block 1110, a packet is received from a remote media aggregation manager. The demultiplexing information (e.g., the tag) added by the remote media multiplexor is stripped from the packet and examined at processing block 1120. Optionally, at processing block 1130, if control and data packets are being multiplexed onto the reservation protocol session, a determination is made whether the packet is a media packet or a control packet based upon the tag. At processing block 1140, the appropriate the local application(s)/endpoint(s) to which the packet is destined is/are determined. As described above, the media multiplexor 350 may perform address translation from a source network address to a destination network address. In this case, the media demultiplexor 360 determines the appropriate local application(s)/endpoint(s) that are to receive the packet by examining the address portion of the tag. Alternatively, if the media multiplexor 350 leaves the source network address in the address portion of the tag, then the media demultiplexor 360 determines the appropriate local application(s)/endpoint(s) by first translating the address portion using a local lookup table, for example.

In any event, finally, at processing block 1150, the media demultiplexor 360 transmits the packet to those of the local application(s)/endpoint(s) identified in processing block 1140. If, according to the particular transport and/or control protocols employed, the application(s)/endpoint(s) receive media packets and control packets on different channels/ports, then the packet is forwarded onto the appropriate channel/port of the local application(s)/endpoints(s) based on the packet classification performed at processing block 1130.

Figure 12:
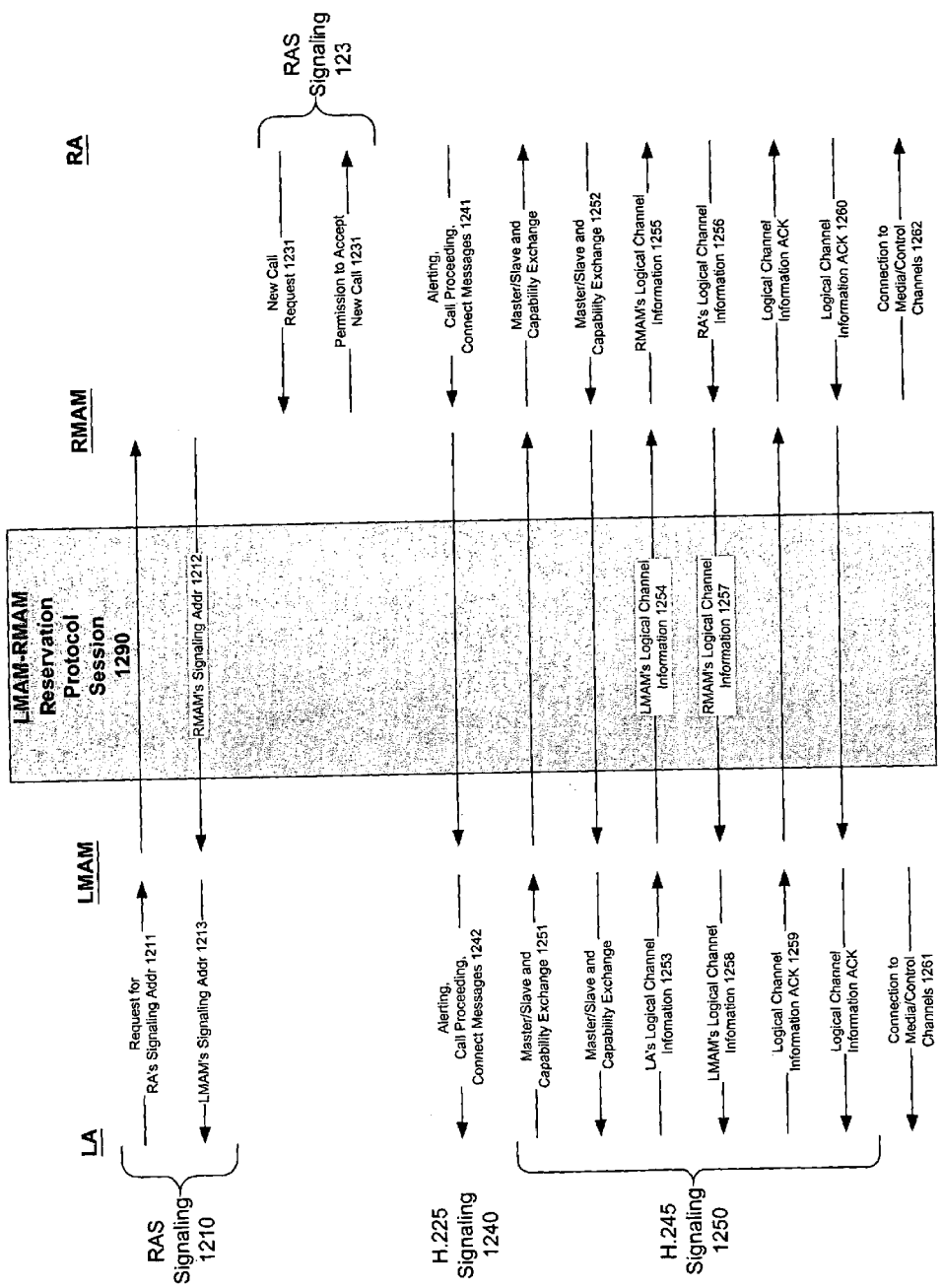
FIG. 12 conceptually illustrates application session establishment in an H.323 environment according to one embodiment of the present invention.

FIG. 12 conceptually illustrates application session establishment in an H.323 environment according to one embodiment of the present invention. In general, the media aggregation managers abstract the true application session endpoints from each other and serve as proxies for their respective local applications/endpoints. As explained above, the media aggregation managers accomplish this by intercepting signaling messages originating from their respective local applications/endpoints and modifying the signaling messages to make themselves appear as the actual callers/recipients.

In this illustration, for simplicity, it is assumed that a single local application/endpoint (LA) is establishing an application session with a single remote application/endpoint (RA) over a pre-allocated reservation protocol session 1290 between a local media aggregation manager (LMAM) geographically proximate to the LA and a remote media aggregation manager (RMAM) geographically proximate to the RA.

According to this example, application session establishment involves RAS signaling 1210 and 1230, H.225 signaling 1240, and H.245 signaling 1250. RAS signaling 1210 begins with a request for the RA signaling address 1211 by the LA to the LMAM. The LMAM transmits the request 1211 via the reservation protocol session 1290 to the RMAM. In response to the request 1211, the RMAM decides it wants to route H.225/H.245 signaling through it instead of letting the RA do it directly. Therefore, the RMAM replies with a packet 1212 containing RMAM's signaling address. Similarly, the LMAM decides it wants to route H.225/H.245 signaling through it instead of letting the LA do it directly. Therefore, the LMAM substitutes its signaling address for that of the RMAM and forwards packet 1213 to the LA.

RAS signaling continues with the RA asking the RMAM (on its RAS channel) if it is okay to accept a new call by sending the RMAM a new call request 1231. The RMAM authorizes the new call by responding with a packet 1231 giving the RA permission to accept the new call.

H.225 signaling comprises the RA sending H.225 alerting/call proceeding/connect messages 1241 to the RMAM. The RMAM sends the same to the LMAM; and the LMAM sends the same to the LA. At this point, the LA determines that H.225 call signaling is complete and starts H.245 signaling.

H.245 signaling begins with the LA sending master/slave and capability exchange messages 1251 to the LMAM, which are relayed to the RMAM and from the RMAM to the RA. Then, the RA sends master/slave and capability exchange messages 1252 to the RMAM. The RMAM transmits these messages to the LMAM; and the LMAM forwards them to the LA.

Subsequently, the LA initiates an exchange of logical channel information by sending logical channel information packets 1253 to the LMAM. The logical channel information identifies the network address (e.g., IP address) and port numbers where RTP/RTCP connections will be accepted. The LMAM stores the LA's logical channel information and passes its own connection information 1254 to the RMAM. Additionally, the LMAM provides the network address of the LA to the RMAM for later use in address translation lookups. As mentioned above, the network address of the LA may be used by the RMM or the RMD depending upon where the address translation lookup is performed. The RMAM remembers the information provided by the LMAM and generates its own RTP/RTCP information 1255 and passes it to the RA.

After receiving logical channel information thought to be associated with the LA, the RA sends its logical channel information 1256 to the RMAM (thinking it is being directed to the LA). The RMAM stores the RA's logical channel information and passes its own connection information 1257 to the LMAM. Additionally, the RMAM provides the network address of the RA to the LMAM. The LMAM remembers the logical channel information provided by the RMAM and generates its own RTP/RTCP information 1258 and passes it to the LA.

The LA sends an ACK message 1259 to the LMAM to acknowledge receipt of what it thinks to be the RA's logical channel information. The acknowledgement is relayed to the RA by the LMAM and the RMAM. The RA also sends an ACK message 1260 to the RMAM to acknowledge receipt of what it thinks to be the LA's logical channel information. The acknowledgement is related to the LA by the RMAM and, the LMAM. Finally, the LMAM and the RMAM each use the logical channel information intercepted from the LA and the RA, respectively, to connect to the media and/or control channels of the LA and RA.

Exemplary Encapsulated Packet Formats

Figure 13A:
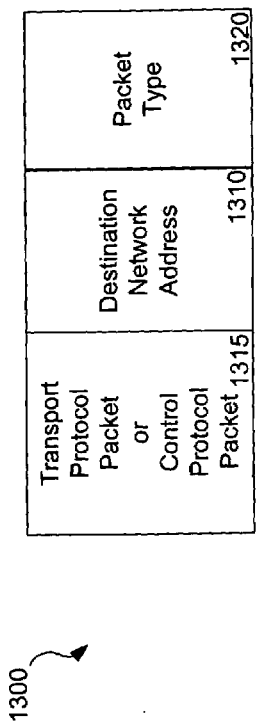
FIG. 13A illustrates the encapsulated ("MUX") packet format according to one embodiment of the present invention in which address replacement is performed by the LMAM.

FIG. 13A illustrates the encapsulated ("MUX") packet format 1300 according to one embodiment of the present invention in which address replacement is performed by the LMAM. The payload of the encapsulated packet 1300 includes a destination network address field 1310, a variable length transport or control protocol packet portion 1315, and a packet type indication 1320. The destination network address 1310 is typically the IP address of the true recipient (e.g., the application/endpoint to which the packet is destined). In environments where multiplexing of control and data is employed, the variable length portion 1315 may include either a transport protocol packet (e.g., a RTP packet) or a control protocol packet (e.g., a RTCP packet) as indicated by the packet type indication 1320. In alternative embodiments, where multiplexing of control and data is not employed, then the variable length portion 1315 would still include either control or data, but the packet type indication 1320 would no longer be necessary.

Figure 13B:
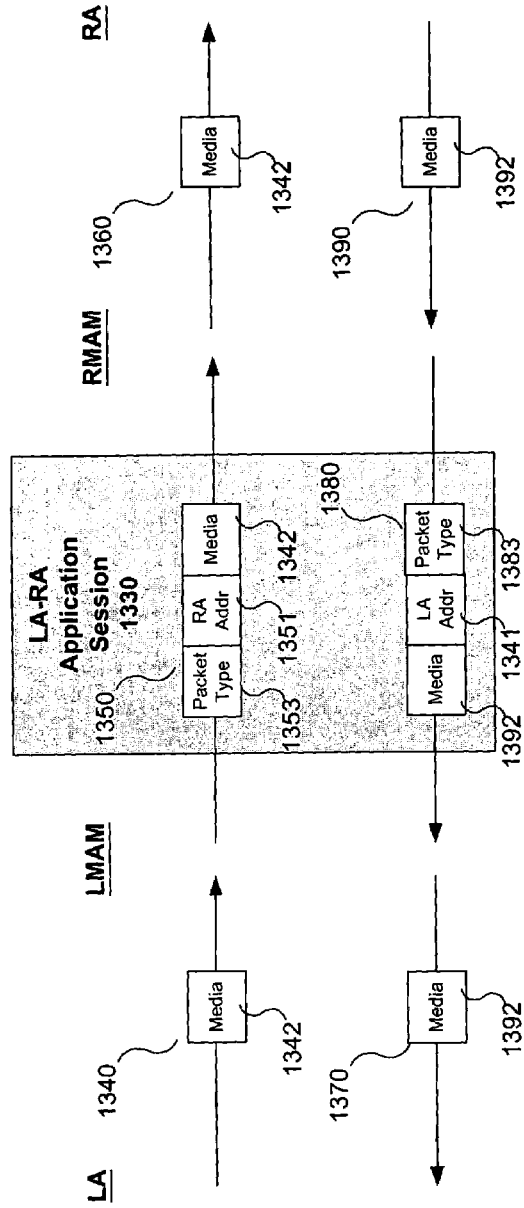
FIG. 13B illustrates media transmission in both directions according to the encapsulated packet format of FIG. 13A.

FIG. 13B illustrates media transmission in both directions according to the encapsulated packet format of FIG. 13A. When the LA originates a media packet, it generates a packet 1340 including media 1342. The LMAM encapsulates the media 1342 in the encapsulated packet format 1300 by generating an encapsulated packet 1350 that includes the RA's network address 1351, the media 1342, and a packet type indicator 1353. For example, upon receipt of packet 1340, the LMAM may append the network address of the RA and a packet type indicator 1353 based upon the channel/port upon which the packet 1340 was received. When the encapsulated packet 1350 is received by the RMAM, it strips the information added by the LMAM and forwards a packet 1360 comprising the media 1342 to the RA.

When the RA originates a media packet, it generates a packet 1390 including media 1392. The RMAM encapsulates the media 1392 in the encapsulated packet format 1300 by generating an encapsulated packet 1380 that includes the LA's network address 1341, the media 1392, and a packet type indicator 1383. For example, upon receipt of packet 1390, the RMAM may append the network address of the LA and a packet type indicator 1383 based upon the channel/port upon which the packet 1390 was received. When the encapsulated packet 1380 is received by the LMAM, it strips the information added by the RMAM and forwards a packet 1370 comprising the media 1392 to the LA.

Figure 14A:
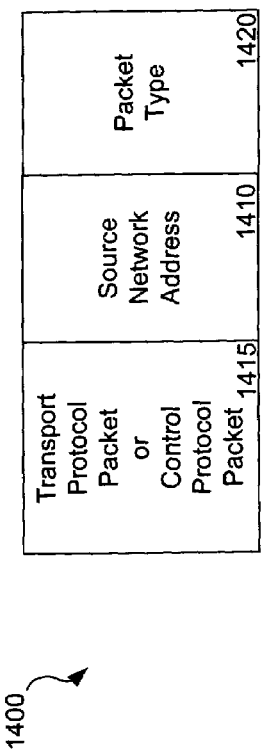
FIG. 14A illustrates the encapsulated ("MUX") packet format according to another embodiment of the present invention in which address replacement is performed by the RMAM.

FIG. 14A illustrates the encapsulated ("MUX") packet format according to another embodiment of the present invention in which address replacement is performed by the RMAM. The payload of the encapsulated packet 1400 includes a source network address field 1410, a variable length transport or control protocol packet portion 1415, and a packet type indication 1420. The source network address 1410 is typically the IP address of the true caller (e.g., the application/endpoint from which the packet is originated). In environments where multiplexing of control and data is employed, the variable length portion 1415 may include either a transport protocol packet (e.g., a RTP packet) or a control protocol packet (e.g., a RTCP packet) as indicated by the packet type indication 1420. In alternative embodiments, where multiplexing of control and data is not employed, then the variable length portion 1415 would still include either control or data, but the packet type indication 1420 would no longer be necessary.

Figure 14B:
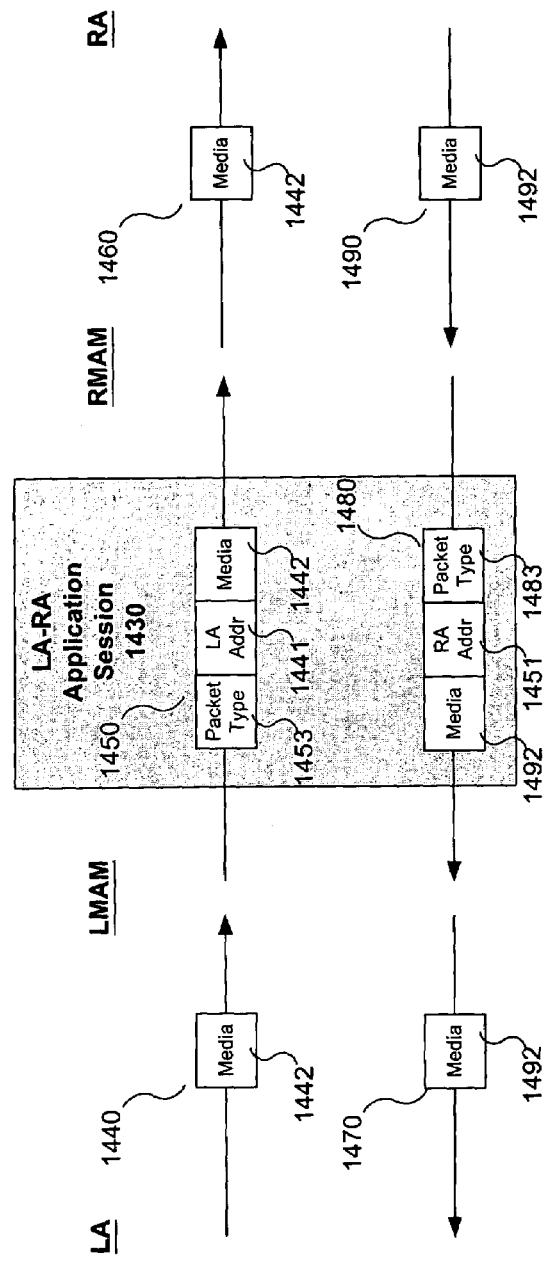
FIG. 14B illustrates media transmission in both directions according to the encapsulated packet format of FIG. 14A.

FIG. 14B illustrates media transmission in both directions according to the encapsulated packet format of FIG. 14A. When the LA originates a media packet, it generates a packet 1440 including media 1442. The LMAM encapsulates the media 1442 in the encapsulated packet format 1400 by generating an encapsulated packet 1450 that includes the LA's network address 1441, the media 1442, and a packet type indicator 1453. For example, upon receipt of packet 1440, the LMAM may append the network address of the LA and a packet type indicator 1453 based upon the channel/port upon which the packet 1440 was received. When the encapsulated packet 1450 is received by the RMAM, it strips the information added by the LMAM and forwards a packet 1460 comprising the media 1442 to the RA by looking up the network address of the RA based upon the LA's network address 1441.

When the RA originates a media packet, it generates a packet 1490 including media 1492. The RMAM encapsulates the media 1492 in the encapsulated packet format 1400 by generating an encapsulated packet 1480 that includes the RA's network address 1451, the media 1492, and a packet type indicator 1483. For example, upon receipt of packet 1480, the RMAM may append the network address of the RA and a packet type indicator 1483 based upon the channel/port upon which the packet 1480 was received. When the encapsulated packet 1480 is received by the LMAM, it strips the information added by the RMAM and forwards a packet 1470 comprising the media 1492 to the RA by looking up the network address of the LA based upon the RA's network address 1451.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
providing a first media aggregation manager at an edge of a first local area network on which a first set of terminals of a first user community of an enterprise reside, the first set of terminals running a first set of local applications on behalf of which the first media aggregation manager is configured to act as a signaling and control proxy;
providing a second media aggregation manager at an edge of a second local area network on which a second set of terminals of a second user community of the enterprise reside, the second set of terminals running a second set of local applications on behalf of which the second media aggregation manager is configured to act as a signaling and control proxy;
pre-allocating a reservation protocol session over a path through an enterprise network between the first media aggregation manager and the second media aggregation manager based upon an estimated usage of the path for real-time communication sessions between the first set of local applications and the second set of local applications; and
multiplexing a plurality of applications flows associated with real-time communication sessions involving one or more source applications of the first set of local applications and one or more destination applications of the second set of local applications onto the pre-allocated reservation protocol session at the first media aggregation manager.

2. The method of claim 1, further comprising demultiplexing the plurality of application flows at the second media aggregation manager.

3. The method of claim 1, wherein the reservation protocol session comprises a Resource Reservation Protocol (RSVP) session.

4. The method of claim 1, wherein at least one of the real-time communication sessions comprises a H.323 session.

5. The method of claim 1, wherein the reservation protocol session comprises a Resource Reservation Protocol (RSVP) session and at least one of the real-time communications sessions comprises a H.323 session.

6. The method of claim 1, further comprising:
forming an encapsulated packet by appending a tag to a media packet received at the first media aggregation manager from a source local application/endpoint of the one or more source applications, the tag including information to allow the second media aggregation manager to determine a destination local application/endpoint of the one or more destination applications; and
removing the tag at the second media aggregation manager prior to forwarding the media packet to the destination local application/endpoint.

7. The method of claim 6, wherein the tag includes a network address associated with the source local application/endpoint.

8. The method of claim 6, wherein the tag includes a network address associated with the destination local application/endpoint.

9. The method of claim 6, wherein the tag includes a packet type indicator that specifies how to further identify a subprocess within the destination local application/endpoint.

10. The method of claim 1, wherein establishment of at least one of the real-time communication sessions involves use of H.323.

11. The method of claim 1, wherein establishment of at least one of the real-time communication sessions involves use of Session Initiation Protocol.

12. A method comprising:
establishing an aggregated reservation protocol session over a path through a network communicatively coupling a first edge device within a first local area network of an enterprise and a second edge device within a second local area network of the enterprise based upon an estimate of the number of individual application sessions needed for the path during a predetermined window of time; and
sharing the aggregated reservation protocol session among a plurality of individual application sessions between one or more terminals of a first set of terminals within the first local area network and associated with the first edge device and one or more terminals of a second set of terminals within the second local area network and associated with the second edge device by appending a tag to media packets associated with corresponding application flows for transmission between the first edge device and the second edge device, the tagged packets being multiplexed onto the aggregated reservation protocol session by the first edge device or the second edge device and demultiplexed by the other including the removal of the tags from the media packets.

13. The method of claim 12, wherein establishment of at least one of the plurality of individual application sessions involves use of H.323.

14. The method of claim 12, wherein establishment of at least one of the plurality of individual application sessions involves use of Session Initiation Protocol.

15. A method comprising:
pre-allocating an aggregated reservation protocol session over a path between a first media aggregation manager and second media aggregation manager of a plurality of media aggregation managers distributed among a plurality of enterprise locations based upon an estimate of the bandwidth requirements for individual application sessions over the path;
sharing the aggregated reservation protocol session among a plurality of individual application sessions established between applications running on devices being fronted by the first and second media aggregation managers by tagging packets at the source media aggregation manager of the first or second media aggregation manager that fronts the source of a particular transmission, multiplexing the tagged packets onto the aggregated reservation protocol session, and demultiplexing the tagged packets at the destination media aggregation manager of the first or second media aggregation manager that fronts the destination of the particular transmissions.

16. The method of claim 15, wherein establishment of at least one of the individual application sessions involves use of H.323.

17. The method of claim 15, wherein establishment of at least one of the individual application sessions involves use of Session Initiation Protocol.

18. A method comprising:
establishing a Resource Reservation Protocol (RSVP) session between a first network device and a second network device that are part of an Internet Protocol (IP) network;
receiving, at the first network device first a first local terminal on behalf of which the first network device acts as a reservation protocol proxy, a request to initiate a first H.323 session with a first remote terminal associated with the second network device;
allocating a portion of pre-allocated resources associated with the RSVP session to the first H.323 session between the first local terminal and the first remote terminal;
receiving, at the first network device from a second local terminal on behalf of which the first network device acts as a reservation protocol proxy, a request to initiate a second H.323 session with a second remote terminal associated with the second network device;
allocating a portion of the pre-allocated resources associated with the RSVP session to the second H.323 session between the second local terminal and the second remote terminal; and
sharing the RSVP session between the first H.323 session and the second H.323 session by multiplexing voice packets associated with the first and second H.323 sessions onto the RSVP session.

19. The method of claim 18, further comprising:
transmitting voice packets from the first local terminal and first remote terminal by forming an encapsulated packet at the first network device that includes tag information to allow the second network device to determine the voice packets are intended for the first remote terminal; and
removing the tag information at the second network device prior to forwarding the voice packets to the first remote terminal.

20. The method of claim 19, wherein the tag information includes the IP address of the first local terminal.

21. The method of claim 19, wherein the tag information includes the IP address of the first remote terminal.

22. The method of claim 19, wherein the tag information includes a packet type indicator that specifies how to further identify a subprocess within the first remote terminal.

23. A method comprising:
establishing a Resource Reservation Protocol (RSVP) session between a first network device and a second network device that are part of an Internet Protocol (IP) network;
the first network device operating as a RSVP proxy on behalf of and presenting itself to a first local terminal associated with the first network device as the intended destination of a first call originated by the first local terminal to a first remote terminal associated with the second network device by providing logical channel information of the first network device to the first local terminal rather than providing logical channel information associated with the first remote terminal;
the first network device operating as a RSVP proxy on behalf of and presenting itself to a second local terminal associated with the first network device as the intended destination of a second call originated by the second local terminal to a second remote terminal associated with the second network device by providing the logical channel information of the first network device to the second local terminal rather than providing logical channel information associated with the second remote terminal; and
the first network device transmitting voice packets from the first local terminal to the first remote terminal and from the second local terminal to the second remote terminal by multiplexing the voice packets onto the RSVP session.

24. The method of claim 23, further comprising the first network device presenting itself as the originator of the first call to the second network device by providing the logical channel information of the first network device to the second network device rather than providing the logical channel information associated with the first local terminal that truly originated the first call.

25. The method of claim 23, wherein establishment of the first call involves use of H.323.

26. The method of claim 23, wherein establishment of the first call involves use of Session Initiation Protocol.

27. A media aggregation manager system comprising:
a resource manager to establish a reservation protocol session with one or more other media aggregation managers prior to establishment of any application sessions that share resources associated with the reservation protocol and to subsequently allocate and deallocate the resources in response to application session establishment requests and application session termination requests, respectively;

an admission control manager coupled to the resource manager, the admission control manager to provide admission control for application flows associated with the application sessions based upon availability of the resources as indicated by the resource manager;

a media multiplexor coupled to the admission control manager, the media multiplexor to tag media packets received from local application/endpoints that are associated with admitted application flows and to transmit the tagged media packets over the reservation protocol session; and a media demultiplexor to forward media packets received from remote application/endpoints to the local application/endpoints based upon tags appended by a media multiplexor of the one or more other media aggregation managers.

28. A network device comprising:

a storage device having stored therein one or more routines for establishing and managing an aggregated reservation protocol session;

a processor coupled to the storage device for executing the one or more routines to pre-allocate the aggregated reservation protocol session and thereafter share the aggregated reservation protocol session among a plurality of individual application sessions, where;

the aggregated reservation protocol session is pre-allocated based upon an estimate of the bandwidth requirements to accommodate the plurality of individual application sessions, the plurality of individual application sessions are established between a plurality of local application/endpoints and a plurality of remote application/endpoints, the aggregated reservation protocol session is shared by multiplexing outbound media packets originated by a local application/endpoint of the plurality of local application/endpoints onto the aggregated reservation protocol session, and demultiplexing inbound media packets originated by a remote application/endpoint of the plurality of remote application/endpoints from the aggregated reservation protocol session.

29. The network device of claim 28, wherein establishment of at least one of the plurality of individual application sessions involves use of H.323.

30. The network device of claim 28, wherein establishment of at least one of the plurality of individual application sessions involves use of Session Initiation Protocol.

31. A system for multiplexing individual application sessions over a pre-allocated reservation protocol session comprising:

a first edge device coupled to and associated with a first plurality of terminals, the first edge device including a multiplexor to provide admission control for application sessions involving one or more terminals of the first plurality of terminal and one or more terminals of a second plurality of terminals and to multiplex packets of admitted application flows over the pre-allocated reservation protocol session; and a second edge device coupled to and associated with the second plurality of terminals, the second edge device including a demultiplexor to forward packets associated with the admitted application flows to an appropriate terminal of the one or more terminals of the second plurality of terminals.

32. The system of claim 31, wherein establishment of an application session associated with at least one of the admitted application flows involves use of H.323.

33. The system of claim 31, wherein establishment of an application session associated with at least one of the admitted application flows involves use of Session Initiation Protocol.

34. A machine-readable medium having stored thereon data representing instructions which, when executed by a processor, cause the processor to perform the steps of:

providing a first media aggregation manager at an edge of a first local area network on which a first set of terminals of a first user community of an enterprise reside, the first set of terminals running a first set of local applications on behalf of which the first media aggregation manager is configured to act as a signaling and control proxy;

providing a second media aggregation manager at an edge of a second local area network on which a second set of terminals of a second user community of the enterprise reside, the second set of terminals running a second set of local applications on behalf of which the second media aggregation manager is configured to act as a signaling and control proxy;

pre-allocating a reservation protocol session over a path through an enterprise network between a first network device associated with a first user community and a second network device associated with a second user community the first media aggregation manager and the second media aggregation manager based upon an estimated usage of the path for real-time communication sessions individual application sessions between the first set of local applications and the second set of local applications users of the first user community and the second user community; and multiplexing a plurality of application flows associated with real-time communication sessions involving one or more source applications of the first set of local applications and one or more destination applications of the second set of local applications involving one or more terminals from the first user community and one or more terminals from the second user community onto the pre-allocated reservation protocol session at the first media aggregation manager.

35. The machine-readable medium of claim 34, wherein the reservation protocol session comprises a Resource Reservation Protocol (RSVP) session.

36. The machine-readable medium of claim 34, wherein at least one of the one or more individual application sessions comprises a H.323 session.

37. The machine-readable medium of claim 34, wherein the reservation protocol session comprises a Resource Reservation Protocol (RSVP) session and at least one of the one or more individual application sessions comprises a H.323 session.

38. The machine-readable medium of claim 34, wherein the instructions further cause the processor to:

form an encapsulated packet by appending a tag to a media packet received at the first network device from a source local application/endpoint associated with the first user community, the tag including information to allow the second network device to determine a destination local application/endpoint associated with the second user community; and remove the tag at the second network device prior to forwarding the media packet to the destination local application/endpoint.

39. The machine-readable medium of claim 38, wherein the tag includes a network address associated with the source local application/endpoint.

40. The machine-readable medium of claim 38, wherein the tag includes a network address associated with the destination local application/endpoint.

41. The machine-readable medium of claim 38, wherein the tag includes a packet type indicator that specifies how to further identify a subprocess within the destination local application/endpoint.

42. A network device comprising:
one or more storage devices having stored therein one or more routines for establishing and managing a reservation protocol session between the network device, acting as a reservation protocol proxy on behalf of a local set of terminals and another network device, acting as a reservation protocol proxy on behalf of a remote set of terminals;
one or more processors coupled to the one or more storage devices for executing the one or more routines to allocate the reservation protocol session and thereafter share the reservation protocol session among a plurality of individual application sessions involving one or more terminals in the local set of terminals and one or more terminals in the remote set of terminals, where:
the plurality of individual application sessions are established between one or more local application/endpoints running on the one or more terminals in the local set of terminals and one or more remote application/endpoints running on the one or more terminals in the remote set of terminals, and
the reservation protocol session is shared by multiplexing outbound media packets originated by the one or more local application/endpoints onto the reservation protocol session, and demultiplexing inbound media packets originated by the one or more remote application/endpoints from the reservation protocol session.

43. A method comprising:
establishing a single Resource Reservation Protocol (RSVP) session for multiple types of real-time communications between a first user community and a second user community over a path through a network communicatively coupling the first user community with the second user community, a first media aggregation manager located geographically proximate to the first user community serving as a first endpoint for the single RSVP session and a second media aggregation manager located geographically proximate to the second user community serving as a second endpoint for the single RSVP session, the single RSVP session being pre-allocated based upon information regarding estimated usage of network resources for the real-time communications based upon historical data;
multiplexing a first set of real-time communication flows associated with individual application sessions involving one or more source terminals from the first user community and one or more destination terminals from the second user community onto the single RSVP session at the first media aggregation manager;
multiplexing a second set of real-time communication flows associated with individual application sessions involving one or more source terminals from the second user community and one or more destination terminals from the first user community onto the single RSVP session at the second media aggregation manager;
demultiplexing, at the second media aggregation manager, the first set of real-time communication flows and directing resulting demultiplexed real-time communication flows to appropriate terminals in the second user community; and
demultiplexing, at the first media aggregation manager, the second set of Teal-time communication flows and directing resulting demultiplexed real-time communication flows to appropriate terminals in the first user community.

44. A method comprising:
providing a first media aggregation manager at an edge of a first local area network on which a first set of terminals of an enterprise reside, the first set of terminals running a first set of local applications on behalf of which the first media aggregation manager is configured to act as a signaling proxy by (i) returning its own signaling address in response to requests received for signaling addresses of any terminal of the first set of terminals, and (ii) substituting its own signaling address in place of a signaling address provided in a signaling address response directed to any terminal of the first set of terminals thereby causing subsequent call signaling and control signaling to be routed through the first media aggregation manager,
providing a second media aggregation manager at an edge of a second local area network on which a second set of terminals of the enterprise reside, the second media aggregation manager configure to act as a signaling proxy by (i) returning its own signaling address in response to requests received for signaling addresses of any terminal of the second set of terminals, and (ii) substituting its own signaling address in place of a signaling address provided in a signaling address response directed to any terminal of the second set of terminals thereby causing subsequent call signaling and control signaling to be routed through the second media aggregation manager;
receiving an indication of a predetermined amount of bandwidth to accommodate an anticipated load offered by a plurality of applications running on the first set of terminals and the second set of terminals for real-time communication among the plurality of applications;
reserving the predetermined portion of available bandwidth over a path through an enterprise network communicatively coupling the first media aggregation manager and the second media aggregation manager for the real-time communication as a real-time bandwidth pool; and
sharing the real-time bandwidth pool among the plurality of applications by, responsive to reservation protocol requests issued by terminals of the first set of terminals and the second set of terminals, the first media aggregation manager and second media aggregation manager selectively establishing real-time communication sessions associated with the plurality of applications through the path based upon currently available resources in the real-time bandwidth pool.

45. A method comprising:
providing a first media aggregation manager at an edge of a first local area network wherein the first media aggregation manager is configured to act as a signaling and control proxy;
providing a second media aggregation manager at an edge of a second local area network the second media aggregation manager is configured to act as a signaling and control proxy;
allocating bandwidth in a reservation protocol session over a path between the first media aggregation manager and the second media aggregation manager based upon an expected usage of the path for real-time communication sessions between a first set of applications associated with the first local area network and a second set of applications associated with the second local area network; and multiplexing a plurality of application flows associated with real-time communication sessions involving one or more source applications of the first set of local applications and one or more destination applications of the second set of local applications onto the reservation protocol session at the first media aggregation manager.

46. The method of claim 45, wherein allocating bandwidth in a reservation protocol session is performed dynamically based on information provided by a centralized entity.

47. The method of claim 45, wherein allocating bandwidth in a reservation protocol session comprises pre-allocating the reservation protocol session based on information provided by a centralized entity.

48. The method of claim 45, wherein expected usage is based on historical information.

49. The method of claim 45, wherein expected usage is based on an estimate of usage.

50. The method of claim 45, further comprising demultiplexing the plurality of application flows at the second media aggregation manager.

51. The method of claim 45, wherein the reservation protocol session comprises a Resource Reservation Protocol (RSVP) session.

52. The method of claim 45, wherein at least one of the real-time communication sessions comprises a H.323 session.

53. The method of claim 45, wherein the reservation protocol session comprises a Resource Reservation Protocol (RSVP) session and at least one of the real-time communication sessions comprises a H.323 session.

54. The method of claim 45, further comprising:
forming an encapsulated packet by appending a tag to a media packet received at the first media aggregation manager from a source local application/endpoint of the one or more source applications, the tag including information to allow the second media aggregation manager to determine a destination local application/endpoint of the one or more destination applications; and
removing the tag at the second media aggregation manager prior to forwarding the media packet to the destination local application/endpoint.

55. A method comprising:
allocating bandwidth in a reservation protocol session over a path between a first media aggregation manager and a second media aggregation manager based upon an expected usage of the path for real-time communication sessions between a first set of applications associated with a first local area network and a second set of applications associated with a second local area network;
multiplexing a plurality of application flows associated with real-time communication sessions involving one or more source applications of the first set of applications and one or more destination applications of the second set of applications onto the reservation protocol session at the first media aggregation manager;
the first media aggregation manager encapsulating media packets associated with the plurality of application flows by appending tags, the tags including information to allow the second media aggregation manager to determine an appropriate destination application of the one or more destination applications;
removing the tags from the media packets at the second media aggregation manager prior to forwarding the media packets to the appropriate destination application.

56. The method of claim 55, wherein said allocating bandwidth in a reservation protocol session is performed dynamically based on information provided by a centralized entity.

57. The method of claim 55, wherein said allocating bandwidth in a reservation protocol session comprises pre-allocating the reservation protocol session based on information provided by a centralized entity.

58. The method of claim 55, wherein the expected usage is based on historical information.

59. The method of claim 55, wherein the expected usage is based on an estimate of projected real-time communication sessions between the first set of applications and the second set of applications.

60. The method of claim 55, further comprising demultiplexing the plurality of application flows at the second media aggregation manager.

61. The method of claim 55, wherein the reservation protocol session comprises a Resource Reservation Protocol (RSVP) session.

62. The method of claim 55, wherein at least one of the real-time communication sessions comprises a H.323 session.

63. The method of claim 55, wherein at least one of the real-time communication sessions comprises a SIP session.

64. The method of claim 55, wherein the reservation protocol session comprises a Resource Reservation Protocol (RSVP) session and at least one of the real-time communication sessions comprises a H.323 session.

65. A method comprising:
providing a first media aggregation manager at an edge of a first local area network on which a first set of tills runs a first set of local applications on behalf of which the first media aggregation manager is configured to act as a signaling and control proxy;
providing a second media aggregation manager at an edge of a second local area network on which a second set of terminals runs a second set of local applications on behalf of which the second media aggregation manager is configured to act as a signaling and control proxy;
allocating a reservation protocol session over a path between the first media aggregation manager and the second media aggregation manager based upon an expected, usage of the path for real-time communication sessions between the first set of local applications and the second set of local applications;
encapsulating media packets associated with real-time communication sessions involving one or more source applications of the first set of local applications and one or more destination applications of the second set of local applications, by appending tags to the media packets; and
multiplexing a plurality of application flows associated with the real-time communication sessions onto the reservation protocol session at the first media aggregation manager.

66. The method of claim 65, wherein said allocating bandwidth in a reservation protocol session is performed dynamically based on information provided by a centralized entity.

67. The method of claim 65, wherein said allocating bandwidth in a reservation protocol session comprises pre-allocating the reservation protocol session based on information provided by a centralized entity.

68. The method of claim 65, wherein the expected usage is based on historical information.

69. The method of claim 65, wherein the expected usage is based on an estimate of projected real-time communication sessions between the first set of applications and the second set of applications.

70. The method of claim 65, further comprising demultiplexing the plurality of application flows at the second media aggregation manager.

71. The method of claim 65, wherein the reservation protocol session comprises a Resource Reservation Protocol (RSVP) session.

72. The method of claim 65, wherein at least one of the real-time communication sessions comprises a H.323 session.

73. The method of claim 65, wherein at least one of the real-time communication sessions comprises a SIP session.

74. The method of claim 65, wherein the reservation protocol session comprises a Resource Reservation Protocol (RSVP) session and at least one of the real-time communication sessions comprises a H.323 session.

75. The method of claim 65, further comprising removing the tag at the second media aggregation manager prior to forwarding the media packet to the destination local application/endpoint.

76. A method comprising:
  providing a first media aggregation manager at an edge of a first local area network;
  providing a second media aggregation manager at an edge of a second local area network;
  the first media aggregation manager dynamically allocating a reservation protocol session over a path between the first media aggregation manager and a second media aggregation manager based upon an expected usage of the path for real-time communication sessions between a first set of terminals fronted by the first media aggregation manager and a second set of terminals fronted by the second media aggregation manager;
  the first media aggregation manager multiplexing a plurality of application flows associated with the real-time communication sessions onto the reservation protocol session by encapsulating media packets of the plurality of application flows with tags appended to the media packets;
  the second media aggregation manager receiving a multiplexed signal from the first media aggregation manager comprising information associated with the plurality of application flows;
  the second media aggregation manager demultiplexing the plurality of application flows and removing the tags prior to forwarding the media packets to destination applications running on the second set of terminals.

77. The method of claim 76, wherein said allocating bandwidth in a reservation protocol session is performed dynamically based on information provided by a centralized entity.

78. The method of claim 76 wherein said allocating bandwidth in a reservation protocol session comprises pre-allocating the reservation protocol session based on information provided by a centralized entity.

79. The method of claim 76, wherein the expected usage is based on historical information.

80. The method of claim 76, wherein the expected usage is based on an estimate of projected real-time communication sessions between the first set of applications and the second set of applications.

81. The method of claim 76, further comprising demultiplexing the plurality of application flows at the second media aggregation manager.

82. The method of claim 76, wherein the reservation protocol session comprises a Resource Reservation Protocol (RSVP) session.

83. The method of claim 76, wherein at least one of the real-time communication sessions comprises a H.323 session.

84. The method of claim 76, wherein at least one of the real-time communication sessions comprises a SIP session.

85. The method of claim 76, wherein the reservation protocol session comprises a Resource Reservation Protocol (RSVP) session and at least one of the real-time communication sessions comprises a H.323 session.

* * * * *